US012779693B2

(12) United States Patent
Riedel et al.

(10) Patent No.: US 12,779,693 B2
(45) Date of Patent: Nov. 3, 2026

(54) MODULAR ROBOT-OPERATED HANDHELD DEVICE

(71) Applicant: KUKA Deutschland GmbH, Augsburg (DE)

(72) Inventors: Martin Riedel, Augsburg (DE); Tom Clauder, Augsburg (DE); Benjamin Woerfel De Oliveira, Augsburg (DE); Markus Wuensch, Augsburg (DE); Christian Weiglein, Augsburg (DE)

(73) Assignee: KUKA Deutschland GmbH (DE)

(*) Notice: Subject to any disclaimer, the term of this patent is extended or adjusted under 35 U.S.C. 154(b) by 367 days.

(21) Appl. No.: 18/718,616

(22) PCT Filed: Nov. 29, 2022

(86) PCT No.: PCT/EP2022/083694
§ 371 (c)(1),
(2) Date: Jun. 11, 2024

(87) PCT Pub. No.: WO2023/110392
PCT Pub. Date: Jun. 22, 2023

(65) Prior Publication Data

US 2024/0399585 A1 Dec. 5, 2024

(30) Foreign Application Priority Data

Dec. 12, 2021 (DE) ..................... 10 2021 132 953.1

(51) Int. Cl.
*B25J 9/16* (2006.01)

(52) U.S. Cl.
CPC .................................. *B25J 9/1689* (2013.01)

(58) Field of Classification Search
CPC ... B25J 11/0005; B25J 11/007; B25J 11/0015; B25J 11/001; B25J 19/023; B25J 13/006; G06F 1/1632
See application file for complete search history.

(56) References Cited

U.S. PATENT DOCUMENTS 10,099,383 B2 * 10/2018 Riedel ...................... B25J 13/02
10,780,587 B2 * 9/2020 Riedel .................... B25J 9/1653
(Continued)

FOREIGN PATENT DOCUMENTS

CN 205600738 U 9/2016
DE 102015206578 B3 8/2016
(Continued)

OTHER PUBLICATIONS

European Patent Office; Search Report in related European Patent Application No. 22 823 400.1 dated Mar. 31, 2025; 5 pages.
(Continued)

*Primary Examiner* — Abhishek M Rathod
(74) *Attorney, Agent, or Firm* — Dorton & Willis, LLP

(57) ABSTRACT

A modular robot-operated handheld device includes a safety base control device arranged in a housing with an emergency-stop trigger and an approval device, as well as a first mechanical coupling formed on one end wall of the housing. A second mechanical coupling, identical to the first mechanical coupling is formed on the other end wall of the housing in such a way that a connection module to be mechanically coupled to the modular robot-operated handheld device can be optionally coupled to the first mechanical coupling on the right-hand side of the modular robot-operated handheld device, or to the second mechanical coupling on the left-hand side of the modular robot-operated handheld device. Associated connection modules can be optionally coupled to the modular robot-operated handheld device.

10 Claims, 16 Drawing Sheets

(56) References Cited

U.S. PATENT DOCUMENTS

| | | | | |
|---|---|---|---|---|
| 11,065,770 | B2 * | 7/2021 | Riedel | G05B 19/409 |
| 11,654,353 | B2 * | 5/2023 | Machida | A63F 13/23 463/37 |
| 11,667,038 | B2 * | 6/2023 | Chen | B25J 13/06 248/316.4 |
| 11,707,670 | B2 * | 7/2023 | Khaira | A63F 13/214 463/37 |
| 2015/0149668 | A1 * | 5/2015 | Joynes | G06F 3/0219 710/62 |
| 2020/0061843 | A1 | 2/2020 | Wang et al. | |
| 2023/0201712 | A1 * | 6/2023 | Kanagawa | A63F 13/24 463/36 |

FOREIGN PATENT DOCUMENTS

| | | | |
|---|---|---|---|
| DE | 102016202881 | B4 | 8/2017 |
| DE | 102016208811 | B3 | 10/2017 |
| DE | 102016222675 | B4 | 5/2018 |
| DE | 102016225688 | B4 | 6/2018 |
| DE | 102018003422 | B4 | 11/2018 |
| EP | 3081347 | B1 | 10/2016 |
| JP | 2004122243 | A | 4/2004 |
| JP | 2012110995 | A | 6/2012 |

OTHER PUBLICATIONS

German Patent Office; Search report in related German Patent Application No. 10 2021 132 953.1 dated Sep. 16, 2022; 6 pages.

European Patent Office; Search Report in related International Patent Application No. PCT/EP2022/083694 dated Jan. 26, 2023; 3 pages.

* cited by examiner

MODULAR ROBOT-OPERATED HANDHELD DEVICE

CROSS-REFERENCE TO RELATED APPLICATIONS

This application is a national phase application under 35 U.S.C. § 371 of International Patent Application No. PCT/EP2022/083694, filed Nov. 29, 2022 (pending), which claims the benefit of priority to German Patent Application No. DE 10 2021 132 953.1, filed Dec. 14, 2021, the disclosures of which are incorporated by reference herein in their entirety.

TECHNICAL FIELD

The invention relates to a modular robot-operated handheld device, comprising a safety base control device arranged in a housing with an emergency-stop triggering means and an approval device. The invention also relates to associated connection modules that can be optionally coupled to the modular robot-operated handheld device EP 3 081 347 B1 describes a robot-operated handheld device, comprising a housing which has a handle-like grip section, a safety base control device arranged in the housing, and at least one holder connected to the housing, which is designed for manually releasable mechanical coupling of the housing to a device which is different from the robot-operated handheld device and which communicates electronically with the safety base control device. The invention also relates to associated devices and a system comprising such a robot-operated handheld device and at least two such devices.

DE 10 2015 206 578 B3 describes a robot-operated handheld device, comprising a housing which has a handle-like grip section, a safety base control device arranged in the housing, and at least one holder which is connected to the housing and is designed for manually releasable mechanical coupling of the housing to a device which is different from the robot-operated handheld device and which communicates electronically with the safety base control device.

DE 10 2016 208 811 B3 describes a mobile safety base control device of a robot, comprising a hand-held housing, an emergency-stop switching means arranged on the housing, a communication device for connecting, in terms of control technology, the mobile safety base control device to a robot controller of the robot, and comprising a holder which is connected to the housing and is designed to support the mobile safety base control device on a mobile terminal device that has a terminal device controller and a multi-touch screen that is designed to transmit inputs via the multi-touch screen to the terminal device controller.

DE 10 2016 222 675 B4 describes a robot-operated handheld device, comprising a manually portable housing, a handle attached to the manually portable housing, an input means which is arranged on the housing for single-handed operation within one-hand's reach of the handle and is designed to form an approval device, upon activation of which a robot controller connected in terms of control technology to the robot-operated handheld device allows a hand-guided movement of a robot arm controlled by the robot controller, and upon deactivation of the approval device the robot controller connected in terms of control technology to the robot-operated handheld device prevents a hand-guided movement of the robot arm controlled by the robot controller, and a multi-dimensional input device which is arranged on the manually portable housing and has a manual actuating member which is mounted on a base body of the multi-dimensional input device so as to be movable in the multiple dimensions, the multi-dimensional input device having at least one sensor which is designed to detect a movement of the manual actuating member relative to the base body in the multiple dimensions, and the base body being rigidly fastened in the manually portable housing.

SUMMARY

The object of the invention is to provide a robot-operated handheld device and various associated connection modules, by means of which the robot-operated handheld device can be used particularly flexibly in different configurations.

The object is achieved by a modular robot-operated handheld device, comprising:

- a housing in the shape of a generalized straight cylinder with two opposite uniform end walls and a longitudinal wall connecting the two end walls,
- a safety base control device arranged in the housing,
- an emergency-stop triggering means which is arranged on the longitudinal wall of the housing and which is connected in terms of control technology to the safety base control device,
- an approval device which is arranged on the longitudinal wall of the housing and is connected to the safety base control device, and
- a first mechanical coupling means formed on one end wall, and a second mechanical coupling means identical to the first mechanical coupling means and formed on the other end wall, such that a connection module to be mechanically coupled to the modular robot-operated handheld device can be coupled optionally to the first mechanical coupling means, on the right-hand side of the modular robot-operated handheld device, or to the second mechanical coupling means, on the left-hand side of the modular robot-operated handheld device.

Previous robot-operated handheld devices have, among other things, handles or handle sections that can be manually gripped entirely optionally either in a right-handed or left-handed manner. However, due to their always monolithic design, the known robot-operated handheld devices still have the problem that although these robot-operated handheld devices can be gripped with either the left hand or the right hand of a person, the functionality of the robot-operated handheld device has hitherto always remained the same. On the one hand, the technical functionalities cannot be changed and/or expanded and, on the other hand, the functionalities of the robot-operated handheld device remain unchanged, including with regard to their relative positioning, regardless of whether the robot-operated handheld device is gripped with the left hand or the right hand. The invention is referred to as a robot-operated handheld device and is accordingly explained in more detail using the example of a robot. The robot-operated handheld device can, however, also generally be referred to as a handheld device if, instead of controlling a robot, it is used to control another machine that is to be operated using safe technology. Controlling a machine other than a robot by means of a robot-operated handheld device according to the invention therefore falls within the scope of the invention.

Since the robot-operated handheld device according to the invention is of modular design, i.e. a plurality of different modules, components, structural elements or assemblies can be coupled optionally to the right-hand side of the robot-operated handheld device or to the left-hand side of the robot-operated handheld device, on the one hand the technical functionality can be varied and on the other hand the varied functionality can also be put together in both mirror-symmetrical configurations, depending on a desired left-handed operation and right-handed operation.

For this purpose, according to the invention, the housing of the new robot-operated handheld device is also designed in its central base body in the shape of a generalized straight cylinder. In the context of the invention, a generalized straight cylinder is understood to mean a cylinder in the mathematical sense. This means that the curve generating the generalized straight cylinder does not necessarily have to be a circle. The curve generating the generalized straight cylinder can in general be any closed curve. The closed curve can be a circle. However, the closed curve can also be an ellipse, a quadrilateral, a square, optionally with rounded corners, or a freeform curve. The shape of the closed curve as the generator of the generalized straight cylinder can be determined in particular with regard to ergonomic aspects, especially corresponding to ergonomic aspects of the shape of a hand of a person who is to hold the robot-operated handheld device according to the invention in one of his hands. The generalized straight cylinder is then created by geometric extrusion of the closed curve along a straight line that is perpendicular to the surface defined by the curve. Due to such a geometric extrusion, the housing is then constructed in a mirror-symmetrical manner.

The two opposite uniform end walls are formed from such a mirror-symmetrical design of the housing of the robot-operated handheld device according to the invention, relative to its center plane. Each end wall has its own mechanical coupling means, the two coupling means being functionally identical.

At least one safety base control device is arranged, i.e. housed, in the housing, thus formed, of the robot-operated handheld device according to the invention.

The safety base control device has at least one emergency-stop triggering means, i.e. an emergency-stop switching means, upon the actuation of which a robot connected to the robot-operated handheld device is immediately brought to a standstill, i.e. stopped using safe technology. In addition to the emergency-stop triggering means, the safety base control device can also have at least one approval device and, if appropriate, at least one start/stop button, a touch-up button, an operating mode selection means, and/or a display means, in particular a lighting means. The start/stop buttons, touch-up button, and/or other additional input means do not necessarily have to be designed using safe technology, but can also be designed using non-safe technology. These can, for example, also be freely programmable buttons to which different desired functionalities can be selectively assigned through special configuration. For example, a button can thus be configured to open and/or close an associated gripper or other tool.

At least the emergency-stop triggering means can be connected, in terms of control technology, to a robot controller of the robot using safe technology, for example via a communication device of the safety base control device. Accordingly, the safety base control device can be configured to communicate with the robot controller of the robot. The mobile safety base control device can either be connected to the robot controller via an electrical connection line, or can be connected to the robot controller via a wireless communication connection.

The safety base control device can be designed and/or configured to control the robot control of the robot by means of the at least one emergency-stop triggering means, the at least one approval device, and/or the at least one start/stop button, the touch-up button, and/or the one operating mode selection means, specifically even if the robot-operated handheld device according to the invention is optionally operated without a coupled connection module.

According to DIN EN ISO 10218-2, every robot system must meet the safety requirements described therein. These include stop functions in the robot system or in robot cells, which must also have an emergency-stop function as described there in order to be able to stop all robot movements and other hazardous functions in the cell or at the interfaces to other regions in the event of danger.

The emergency-stop function of robots must meet the requirements of DIN EN ISO 10218-1 and, among other things, have an emergency-stop device in accordance with DIN EN (IEC) 60204-1. Electrical or electronic control circuits which are designed and equipped to meet the safety requirements are also referred to as safety circuits.

The assignment of the emergency-stop functionality between the at least one emergency-stop device, i.e. an emergency-stop triggering means, and the at least one robot system can be achieved by integrating the emergency-stop device, e.g. an emergency-stop apparatus according to DIN EN (IEC) 60204-1, into the safety circuit of the at least one robot system. Such integration can be achieved by connecting the emergency-stop device electrically and functionally to the safety circuit of the robot system using safe technology. Through such an electrical and functional connection, the robot system can be automatically transferred to a safe state, particularly when the integrated emergency-stop device is triggered manually, so that no imminent danger can arise from the robot system (and from other machines possibly assigned via the common safety circuit).

The approval device forms a safety function which is intended to ensure that a person always consciously controls the robot arm, for example in manual mode. For this purpose, the approval device can have a manual button, which can in particular have three switching states. If the manual button is in its rest position, i.e. the manual button is not being operated by a person, the approval device is deactivated and the robot controller connected to the robot-operated handheld device prevents manual movement of the robot arm controlled by the robot controller in this state. If the manual button is in its activation position—i.e. the manual button is being operated by a person with an actuating force that lies between a minimum force and a maximum force—the approval device is activated and the robot controller that is connected in terms of control technology to the robot-operated handheld device allows a hand-guided movement of a robot arm controlled by the robot controller. A third switching state can occur when a person presses the manual button with more than the maximum force, i.e. over-pressing it convulsively so to speak, which is interpreted as an emergency situation and has the automatic consequence that the approval device is immediately deactivated again and the robot controller, which is connected in terms of control technology to the robot-operated handheld device, in this state immediately prevents any hand-guided movement of the robot arm controlled by the robot controller or immediately stops any movement, i.e. all joints of the robot arm are braked to a standstill. The approval device can also be referred to as an approval switch or approval button.

The robot-operated handheld device according to the invention can thus form a base control device for the robot. It can provide a basic functionality for the robot, especially in terms of a safety functionality.

The robot-operated handheld device according to the invention can also be mechanically and/or electrically coupled to a stationary base, such as a wall connection box. Such a stationary base can be connected in series with a control device and the robot-operated handheld device, or the stationary base can be interposed between the control device and the robot-operated handheld device. The stationary base can, for example, also have a stationary emergency stop and/or additional electronics, such as a USB-LAN converter, in order to be able to relocate these from the robot-operated handheld device according to the invention, for example for reasons of space.

Due to the geometric extrusion of the robot-operated handheld device according to the invention, a longitudinal wall is created on the housing, which connects the two end walls. The emergency-stop triggering means is arranged on this longitudinal wall of the housing and is connected in terms of control technology to the safety base control device. In addition, at least the approval device, which is connected in terms of control technology to the safety base control device, is also arranged on the longitudinal wall of the housing. Due to the arrangement of the emergency-stop triggering means and the approval device on the longitudinal wall of the housing, the two opposite end walls of the housing remain free, in order to be able to in each case couple a connection module there, in particular to be able to couple it so that it completely covers the respective end wall.

According to the invention, a first mechanical coupling means is formed on one end wall and a second mechanical coupling means is formed on the other end wall. In this case, the second mechanical coupling means is designed identically to the first mechanical coupling means.

An identical design of the first mechanical coupling means and the second mechanical coupling means means that a connection module (arbitrarily selected) to be mechanically coupled to the modular robot-operated handheld device can optionally be coupled to the first mechanical coupling means, on the right-hand side of the modular robot-operated handheld device, or alternatively can be coupled to the second mechanical coupling means, on the left-hand side of the modular robot-operated handheld device.

Differently designed, i.e. different, connection modules can be provided. Each different type of connection module can have different types and numbers of input means, output means, and/or control functionalities. Each individually selected connection module can then either be coupled to the first mechanical coupling means, on the right-hand side of the modular robot-operated handheld device, or alternatively can be coupled to the second mechanical coupling means, on the left-hand side of the modular robot-operated handheld device.

Instead of coupling a connection module to the modular robot-operated handheld device, it can also be provided that the modular robot-operated handheld device itself is coupled to another device or another apparatus, or at least mechanically connected to it. For example, the modular robot-operated handheld device can be coupled to a link of a robot arm, to a hand flange of a robot arm, to a tool to be handled by the robot arm, or to a mobile vehicle, and specifically here too optionally on the right-hand side of the modular robot-operated handheld device, by means of the first mechanical coupling means, or alternatively on the left-hand side of the modular robot-operated handheld device, by means of the second mechanical coupling means.

The first mechanical coupling means and the second mechanical coupling means can each have a form-locking element which is designed for the axial plugging and axial unplugging of a connection module in a plug-in direction perpendicular to the respectively associated end wall, and for the form-fitting locking of the connection module perpendicularly to the plug-in direction.

The respective coupling means can accordingly have at least one projection and/or at least one recess, which are also geometrically extruded, analogously to the housing of the modular robot-operated handheld device. The shape of the coupling means can be formed by geometrically extruding a closed curve, which determines the shape of the respective coupling means, along a straight line that is perpendicular to the surface defined by the closed curve. In the simplest case, the curve can be a circle or a ring, which results in a geometrically extruded shape, a straight circular-cylindrical shape, or a circular-annular or circular-tubular shape of the respective coupling means. The connection module to be coupled in each case can have a correspondingly opposite shape. This means that the counter-coupling means of the connection module to be coupled is designed to correspond in shape to the shape of the respective coupling means of the modular robot-operated handheld device. If the shape of the counter-coupling means of the connection module, which is to be coupled, and the shape of the coupling means of the modular robot-operated handheld device are designed to correspond, the counter-coupling means and the coupling means will fit together in a form-fitting manner according to the plug/socket or plug/coupling principle. Thus, for example, one coupling partner (coupling means or counter-coupling means) can have a straight circular-cylindrical shape with a defined outer longitudinal wall, and the other coupling partner (counter-coupling means or coupling means) can have a straight hollow circular-cylindrical shape with a defined inner longitudinal wall, which fit together in the assembled state of the counter-coupling means and coupling means in the manner of a fit. The coupling means and the counter-coupling means can also have interacting latching means or snap-in connections, which can be designed to prevent unintentional detachment from one another. In a modification, the coupling means and/or the counter-coupling means can, however, for example also have a magnet which, in interaction with another magnet or a metal element on the other coupling partner, creates a force-fitting connection in the axial direction, the plug-in direction, so that the coupling means and the counter-coupling means cannot unintendedly become detached from one another.

The coupling means and/or the counter-coupling means can connect the respective coupling partners to one another to varying degrees. This means that they can also be difficult to detach to different degrees. This is useful, for example, when a plurality of modules are to be connected, and a separation of two specific coupling partners has priority, i.e. should take place first. It can thus be provided, for example, for a tablet computer to be separated first. This can be achieved, for example, by using magnetic connections of varying strengths or by adding additional locking elements with different triggering functions.

The first mechanical coupling means and the second mechanical coupling means can each be arranged centrally in a central surface portion of the respectively associated end wall, and can each be enclosed by a support surface formed on the respectively associated end wall and surrounding the respective central surface portion.

The total surface area of the respective end wall can be significantly larger than the areal extent of the respective mechanical coupling means (first mechanical coupling means or second mechanical coupling means) itself. This means that the connection module to be coupled can over a large area abut the respective coupled end wall of the modular robot-operated handheld device. This ensures, among other things, that the connection module abuts the modular robot-operated handheld device over its entire surface and without tilting. In addition, loading bending forces and/or tilting forces are prevented and thus kept away from the mechanical coupling means and the counter-coupling means. An edge of the respective end wall can have a peripheral sealing portion. The sealing portion can, for example, be attached to the end wall in the form of a peripheral seal. For example, a separately manufactured seal can be attached to the end wall, for example by gluing. Alternatively, in the case of a housing made of plastic, the peripheral seal can be molded directly onto the end wall during production, for example in the form of a thermoplastic elastomer material, for example in a two-component injection-molding process. Due to such a seal, the connection module can be coupled to the modular robot-operated handheld device without any gaps and thus in a dust-tight manner.

The first mechanical coupling means and the second mechanical coupling means can each be formed by a central dome which is arranged in a recess of the respectively associated end wall and projects outwards from the bottom of the recess.

Due to the design of the first mechanical coupling means and the second mechanical coupling means as a central dome, a projection is created which, in this respect, forms a plug onto which the connection module can be easily plugged. Since the dome is arranged in a recess of the respectively associated end wall, the dome nevertheless does not project outwards, or at most only slightly, beyond the plane of the end wall, or at most only slightly projects outwards beyond the support surface which surrounds the respective central surface portion.

The first mechanical coupling means and the second mechanical coupling means can optionally each be designed to be rotationally symmetrical to an axis of symmetry aligned perpendicularly to the plane of the respectively associated end wall, i.e. the plug-in axis, such that the connection module to be coupled in each case can be coupled to the modular robot-operated handheld device in a plurality of different rotational positions. If rotatability of the connection module relative to the modular robot-operated handheld device is not desired and is therefore to be prevented, a locking projection or a locking rib can be assigned in each case to the first mechanical coupling means and to the second mechanical coupling means, for example in the form of a radially projecting nose, so that rotation is reliably prevented.

The longitudinal wall may have an upper longitudinal outer surface portion, a lower longitudinal outer surface portion, a front convex longitudinal outer surface portion which forms a finger support region, and a rear concave longitudinal outer surface portion which forms a palm support region. The concave and convex surfaces can also be formed by freeform surfaces. Such freeform surfaces can then be ergonomically adapted to the shape of a person's hand.

In other words, the housing can have a basic shape which at least substantially corresponds to the shape of a three-dimensional ring segment. The concave shape, in particular a radius of curvature of the rear concave longitudinal outer surface portion, can be adapted to or correspond to the shape of the palm of a human hand. In such a sense, the front convex longitudinal outer surface portion may also have a radius of curvature that is adapted to the position of partially curved fingers of a person's hand or corresponds to their positions when the modular robot-operated handheld device is held in the hand. In this respect, the front convex longitudinal outer surface portion can extend coaxially at a distance from the rear concave longitudinal outer surface portion.

The modular robot-operated handheld device can have a removable adapter which has a counter-coupling means which corresponds, in a shape-complementing manner, to the first mechanical coupling means and to the second mechanical coupling means of the modular robot-operated handheld device, and which has at least one further mechanical coupling means which is identical to the first mechanical coupling means and to the second mechanical coupling means of the modular robot-operated handheld device.

The counter-coupling means of the adapter serves to enable the adapter to be coupled to the first mechanical coupling means or to the second mechanical coupling means of the modular robot-operated handheld device. The at least one further mechanical coupling means of the adapter then forms a coupling point for a connection module. This means that the adapter connects the respective connection module to the modular robot-operated handheld device by the adapter being inserted between the connection module and the modular robot-operated handheld device. The relative position and/or location of the counter-coupling means of the adapter with respect to the further mechanical coupling means of the adapter then determines the relative location of the coupled connection module with respect to the modular robot-operated handheld device. In this respect, the counter-coupling means of the adapter and the further mechanical coupling means of the adapter can, for example, be arranged axially offset or even at an angle to each other with respect to the plug-in directions.

At least one first lighting means can be arranged on the longitudinal wall of the modular robot-operated handheld device, and/or at least one second lighting means can be arranged on at least one of the two end walls of the modular robot-operated handheld device. The at least one first lighting means and/or the at least one second lighting means may comprise at least one LED component. In the case of the at least one second lighting means, one LED component or a plurality of LED components can be positioned extending along a circular ring arranged coaxially to the respective coupling means on the respective end wall of the housing. In this respect, the LED component can comprise a plurality of light ring segments arranged at intervals from one another on a circle, or the LED component can be designed to emit light in a ring-shaped manner. A first lighting means can be assigned to the emergency-stop triggering device. In particular, a first lighting means that emits light in a ring-shaped manner can be arranged around the emergency-stop triggering means. A further first lighting means can be locally assigned to the approval device and/or to further input means.

The modular robot-operated handheld device can have a holding strap which comprises a strap loop portion which is designed to run over the back of a hand of a person when the person is holding the modular robot-operated handheld device in his hand, and the strap loop portion is connected to a connecting member which has a counter-coupling member which corresponds in a shape-complementing manner to the first mechanical coupling means and the second mechanical coupling means of the modular robot-operated handheld device and which is designed to hold the strap loop portion on the modular robot-operated handheld device when the holding strap is attached to the modular robot-operated handheld device.

The holding strap can, for example, have a fixed carrier plate as a connecting element, which has on its outer side the counter-coupling element that corresponds, in a shape-complementing manner, to the first mechanical coupling means and the second mechanical coupling means of the modular robot-operated handheld device. An inner side of the carrier plate can have depressions, grooves and/or protruding ribs which are ergonomically adapted to the shape of a hand or the adjacent fingers of a hand, in order to ensure a good grip for a person's hand. The strap loop portion can be fixed at opposite edge portions of the carrier plate. The strap loop portion can be designed to be adjustable in length. The strap loop portion may be made of a resilient material. The strap loop portion can, for example, be a textile rubber band.

The object is also achieved in connection with a modular robot-operated handheld device by an associated connection module, which is designed as a separate device from the modular robot-operated handheld device according to one of the described embodiments, from the group of devices comprising a tablet computer, a computer keyboard, a computer mouse, a joystick, jog shuttle and a jog dial, and has a module housing which has a module counter-coupling means which corresponds in a shape-complementing manner to the first mechanical coupling means and to the second mechanical coupling means of a modular robot-operated handheld device according to one of the described embodiments.

Each connection module can have a basic module housing which has a contour that is the same as that of the housing of the modular handheld device. This means that the basic module housing can have a longitudinal wall which is geometrically extruded from the same curve as the curve from which the housing of the modular handheld device is geometrically extruded. The thicknesses of the basic module housings in the extrusion direction can vary.

Each connection module or each type of connection module forms a separate device from the modular robot-operated handheld device, which can have different functions depending on the type. For example, different types and numbers of sensors, input means, output means such as lighting means and/or control electronics, can be provided on different connection modules of different types.

Each type of connection module can, for example, be formed from the group of devices comprising a tablet computer, a computer keyboard, a computer mouse, a joystick, jog shuttle and a jog dial. The connection module can, however, also be a VR glasses controller or an AR glasses controller.

Mechanical input means can also be attached using an intermediate adapter, for example directly on the edge of a tablet computer.

The robot-operated handheld device according to the invention can also have a mechanical input means, such as a joystick, which is provided with a coupling means, so that the joystick can also be docked directly to a robot in order, for example, to be able to manually guide this possibly non-sensitive robot. In this case, docking points can also be attachable to a sample workpiece, in order to enable initial teaching of the process.

A connection module with a joystick can, for example, have a basic module housing which has the module counter-coupling means on its underside and an input means on its upper side, which is formed by a hand knob or hand lever which can be moved in particular in 3 degrees of freedom or in 6 degrees of freedom in order to generate an associated electrical signal in each direction of movement, which can be used to control electronic functions.

A connection module with a jog shuttle or a jog dial can have functionalities analogous to a joystick, and in this case, as a replacement or in addition, have a rotary functionality like a rotary actuator. Such a connection module can also have a corresponding basic module housing, which has the module counter-coupling means on its underside and has an input means on its upper side, which is formed, for example, by a circular-cylindrical disk that can be moved in a plurality of degrees of freedom, including rotation about its axis of rotation, in order to generate an associated electrical signal in each corresponding direction of movement, which signal can be used to control electronic functions.

Another type of connection module can be designed like a computer keyboard and accordingly have a plurality of individual keys. In this case, each key can be assigned a letter of the alphabet, or a number, or a group of a plurality of letters of the alphabet, or a number, which can be selected optionally, for example by pressing the respective key once or multiple times.

However, all the different types of connection modules have in common the fact that they all have a module counter-coupling means that corresponds, in a shape-complementing manner, to the first mechanical coupling means and the second mechanical coupling means of the modular robot-operated handheld device according to one of the described embodiments. This makes it possible for each of the different types of connection modules to be selectively connected to the modular robot-operated handheld device.

This novel approach to operating robots thus provides for a modular kit that can be expanded and/or temporarily adapted by the user in an adaptive and situation-appropriate manner. The basis of this kit is the compact and minimalistic unit of the modular robot-operated handheld device, which can have a certain number of basic buttons, such as the safe emergency stop, the safe approval button, and optionally other input means, such as a start/stop button and/or a touch-up button. Furthermore, the modular robot-operated handheld device has at least two opposing mechanical interfaces, which provide coupling means for connecting to other connection modules. In addition, one or more electrical interfaces, such as a USB interface or similar communication interfaces, can be present on the base of the modular robot-operated handheld device, in order to transfer data, transmit energy, and/or identify coupling partners, i.e. coupled connection modules.

A simple LED lighting element, e.g. in the form of a light ring integrated into the housing, can round off the basic range of functions of the modular robot-operated handheld device for the rear illumination of a partially transparent housing element. The exemplary light ring, or the two light rings, can be arranged in the identically designed side walls of the modular robot-operated handheld device and can emit light either indirectly inwards or directly outwards, depending on the installation direction. The inward orientation can, for example, illuminate a transparent or matted transparent longitudinal wall of the housing of the modular robot-operated handheld device. An outward orientation can shine into the recesses of the end walls, which can have a particularly thin, translucent wall thickness locally, for example in the form of a pattern or logo.

In a first variant, the modular robot-operated handheld device can be connected to a robot controller via cable. However, in further variants the modular robot-operated handheld device can also have a radio connection and, for example, a rechargeable electrical energy storage device, such as a battery.

The basic structure of the modular robot-operated handheld device is designed to be as reduced and space-saving as possible and, thanks to its shape and button distribution, offers sufficiently good ergonomics not only for holding the modular robot-operated handheld device but also in further interaction scenarios with the modular robot-operated handheld device.

A special feature is its essentially symmetrical structure with respect to the center plane, which allows both right-handed and left-handed use in equal measure. This also means that the mechanical interface, i.e. the coupling means, must be arranged on both sides and preferably symmetrically, and enables coupling of different connection modules on both sides. The coupling means can optionally in particular be arranged to be set back in such a way that, when coupled, the coupled connection module rests on the flat side surface of the modular robot-operated handheld device. In this case, the contact surface can be located as far to the outside as possible, thus giving the coupling pair additional stability. In addition, this ensures that there are no gaps between the modular robot-operated handheld device and the coupled connection module. If, for example, a tablet computer is coupled as a connection module, the holding ergonomics for the person can be further improved by a close-fitting modular robot-operated handheld device if the tablet computer can rest directly next to the person's hand and also on the person's forearm.

The modular robot-operated handheld device and the connection module can be coupled in a force-locking and/or form-locking manner and can include, among other things, magnets, springs and/or mechanical locking elements. The coupling process is carried out one-handedly, for example, by a simple slide in the direction of impact or transverse direction, possibly followed by a twist about the direction of impact, similarly to a bayonet lock. A release is effected analogously in reverse, but can in one form include an unlocking process.

In addition to a purely mechanical function, the coupling unit can also make possible an electrical coupling, in that a plug connection or a spring contact connection is integrated in the region of the respective coupling means.

The modular robot-operated handheld device can also be connected in other ways instead of with a connection module.

The modular robot-operated handheld device can also be coupled to a link of a robot, for example. A counter-coupling means can, for example, be attached to the robot, in particular distally behind the last hand axis. If the modular robot-operated handheld device is temporarily coupled to a link of the robot arm, it may be possible to guide the robot manually with one hand, when the approval device is activated.

The modular robot-operated handheld device can for example also be coupled to a robot cell, i.e. to a fixed component of the robot cell. For this purpose, the counter-coupling means can be attached to a support or column which is located directly in or on the cell. This can also serve as a storage location for the modular robot-operated handheld device when not in use.

The connection module can also be a display module. Such a display module can, for example, have a minimalistic display, possibly with touch functionality.

The connection module can optionally also be a commercially available smart phone, if it has been equipped with a counter-coupling means.

The connection module can also be a measuring means. Additional elements that are to be used, for example, for measuring or capturing poses in space, e.g. measuring marks with measuring tips, can be connected to the modular robot-operated handheld device via the coupling means, in particular in order to enable simplified handling with the inclusion of the hardware buttons.

For input means that can be held in a direction-sensitive manner, such as a 6D mouse, an acceleration sensor can detect the orientation and correctly link the spatial directions and input directions.

With regard to a possible requirement for a "single point of control", it may be necessary for the modular robot-operated handheld device to be located near the machine in question, in particular the robot, and in particular at a location where they can be connected to one another.

This can be achieved, for example, by connecting the tablet computer and the modular robot-operated handheld device by a cable, in particular by a USB cable of limited length. Alternatively, a button on the modular robot-operated handheld device can be mechanically coded, for example according to the key-lock principle, and operated by the tablet computer via the coupling means. Furthermore, an electrical circuit in the modular robot-operated handheld device can be connected to the tablet computer via a conductive bridge in the coupling means.

An NFC reader in the modular robot-operated handheld device can detect a tag on the connection module. Alternatively or additionally, an NFC reader can be arranged in the tablet computer and detect a tag in the modular robot-operated handheld device. For example, a distance from the tablet computer can also be estimated by using a Bluetooth transmitter in the modular robot-operated handheld device. A magnetic sensor in the modular robot-operated handheld device can detect a magnet in the connection module.

Furthermore, before a program execution, this program can be selected and prepared using the tablet computer. A confirmation sends the "ready" command to the controller. Signal lights on the modular robot-operated handheld device and the robot can signal readiness to proceed, e.g. by flashing, and show once again the correct assignment of the modular robot-operated handheld device to the robot. By pressing a start button on the modular robot-operated handheld device, for example, the movement can then be finally started, i.e. authorized.

If the modular robot-operated handheld device is to be used in conjunction with a portable computer, such as a notebook, comparable forms of detection can be used, such as short cables or NFC readers on the notebook to which the modular robot-operated handheld device must be connected in order to be able to start a movement via the notebook.

Analogously to the coupling-pairing detection of the modular robot-operated handheld device with a tablet computer, the coupling pairing of the modular robot-operated handheld device to the robot can also be detected, for example in order to be able to automatically switch to the hand-guiding program mode.

A modular robot-operated handheld device attached to the robot may have a transverse guide element that compresses and retracts upon axial contact. This helps to prevent point impacts. When coupled with the modular robot-operated handheld device, however, the guide element is not pressed in, but rather can sufficiently support the coupling pair in the transverse direction.

The modular robot-operated handheld device can communicate either directly with the controller via cable or by radio or it can be connected to a wall-mounted device fixedly mounted near the robot, which in turn can be directly connected to the controller. Such a wall-mounted device can have an additional emergency-stop switching means with which the emergency stop of the modular robot-operated handheld device can be connected in series. In addition, the wall-mounted device can have one or more electrical interfaces to which the modular robot-operated handheld device or other peripherals or one of the connection modules can be connected. Likewise, space-intensive electronic components, such as in particular the control electronics of the LEDs, can be relocated from the very limited installation space of the modular robot-operated handheld device to the wall-mounted device.

Specific embodiments of the invention are explained in more detail in the following descriptions with reference to the accompanying drawings. Specific features of these embodiments, possibly considered individually or in further combinations, can represent general features of the invention, regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
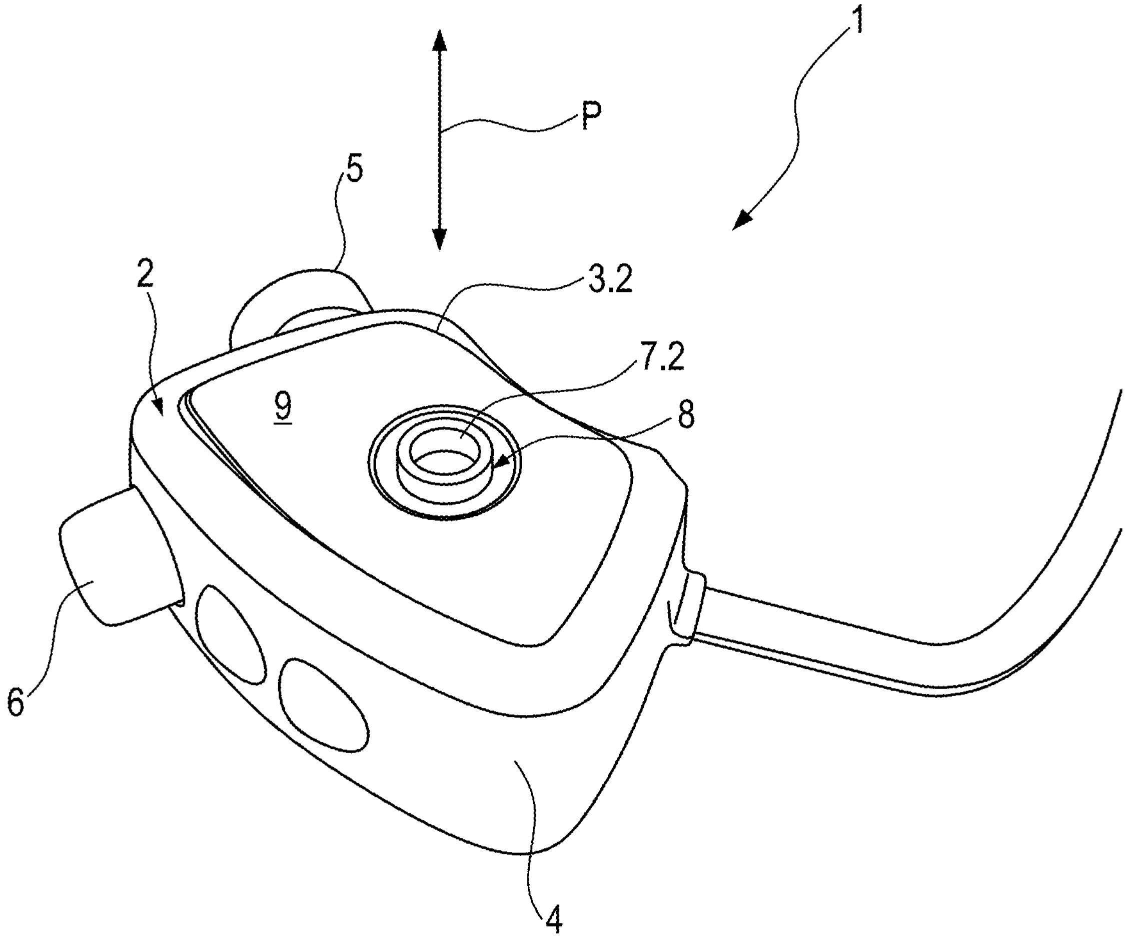
FIG. 1 is a perspective view of an example of a specific embodiment of a modular robot-operated handheld device.
Figure 2:
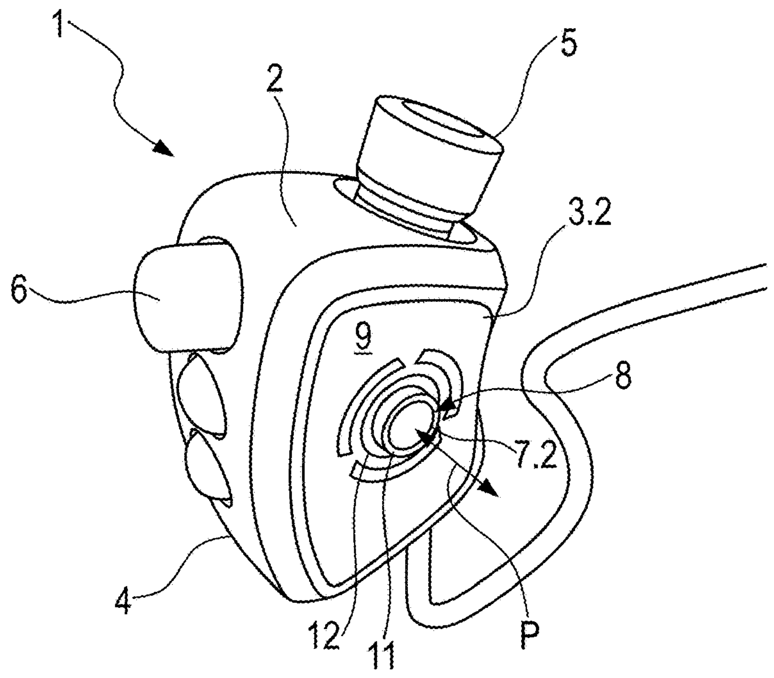
FIG. 2 is a perspective view from the left of the modular robot-operated handheld device according to FIG. 1.
Figure 3:
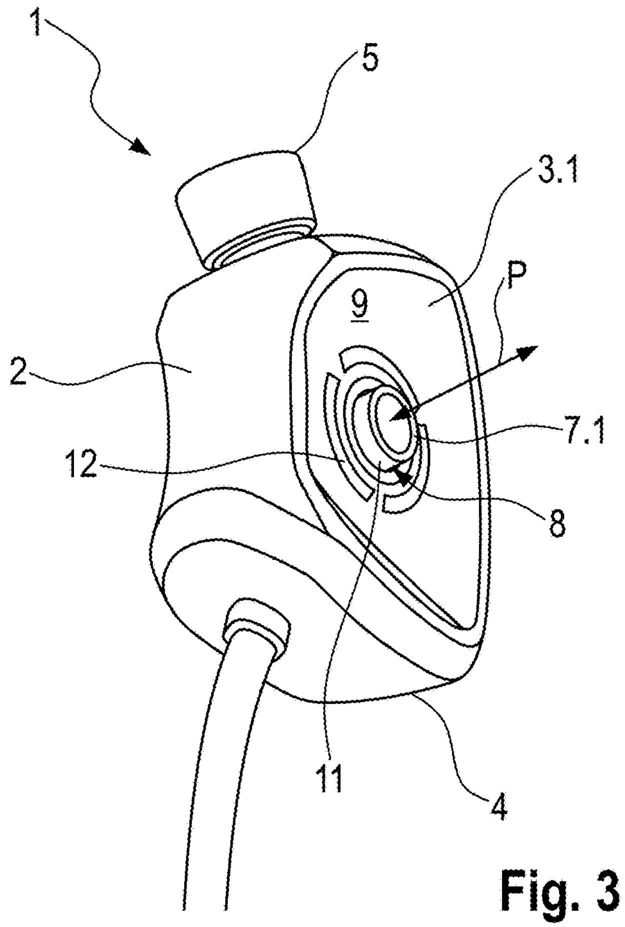
FIG. 3 is a perspective view from the right of the modular robot-operated handheld device according to FIG. 1.

FIG. 1 shows a specific exemplary embodiment of a modular robot-operated handheld device 1. The modular robot-operated handheld device 1 has a housing 2 in the form of a generalized straight cylinder with two opposite uniform end walls 3.1, 3.2 and a longitudinal wall 4 connecting the two end walls 3.1, 3.2.

The modular robot-operated handheld device 1 has a safety base control device arranged in the housing 2.

The modular robot-operated handheld device 1 also has an emergency-stop triggering means 5 which is arranged on the longitudinal wall 4 of the housing 2 and is connected in terms of control technology to the safety base control device, and an approval device 6 which is also arranged on the longitudinal wall 4 of the housing 2 and which is also connected in terms of control technology to the safety base control device.

A first mechanical coupling means 7.1 formed on one end wall 3.1, and a second mechanical coupling means 7.2 identical to the first mechanical coupling means 7.1 and formed on the other end wall 3.2, are arranged opposite one another in such a way that a connection module 10 to be mechanically coupled to the modular robot-operated handheld device 1 can be coupled optionally to the first mechanical coupling means 7.1, on the right-hand side of the modular robot-operated handheld device 1, or to the second mechanical coupling means 7.2, on the left-hand side of the modular robot-operated handheld device 1.

In the case of the present exemplary embodiment, the first mechanical coupling means 7.1 and the second mechanical coupling means 7.2 each have a form-locking element 8, which is designed for the axial plugging and axial unplugging, in the direction of the arrow P, of a connection module 10 in a plug-in direction perpendicular to the respectively associated end wall 3.1, 3.2, and for the form-fitting locking of the connection module 10 perpendicularly to the plug-in direction.

In the case of the present exemplary embodiment, the first mechanical coupling means 7.1 and the second mechanical coupling means 7.2 are each arranged centrally in a central surface portion of the respectively associated end wall 3.1, 3.2 and are each enclosed by a support surface 9 formed on the respectively associated end wall 3.1, 3.2 and surrounding the respective central surface portion.

In the case of the present exemplary embodiment, the first mechanical coupling means 7.1 and the second mechanical coupling means 7.2 are each formed by a central dome 11 which is arranged in a recess 12 of the respectively associated end wall 3.1, 3.2 and projects outwards from the bottom of the recess 12.

Figure 4:
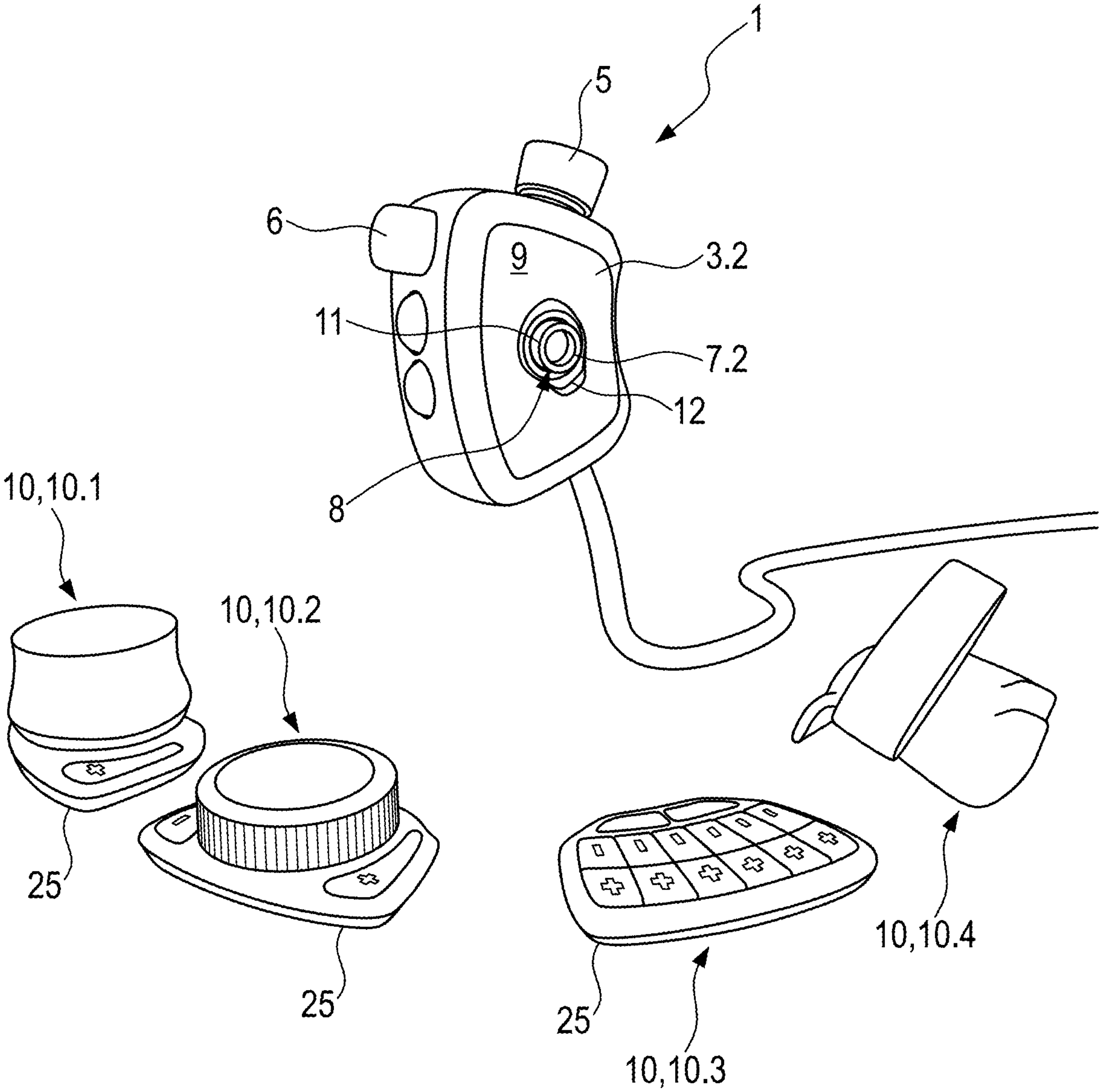
FIG. 4 is a schematic overview of examples of various modules that can be optionally coupled to the modular robot-operated handheld device according to FIG. 1.
Figure 17:
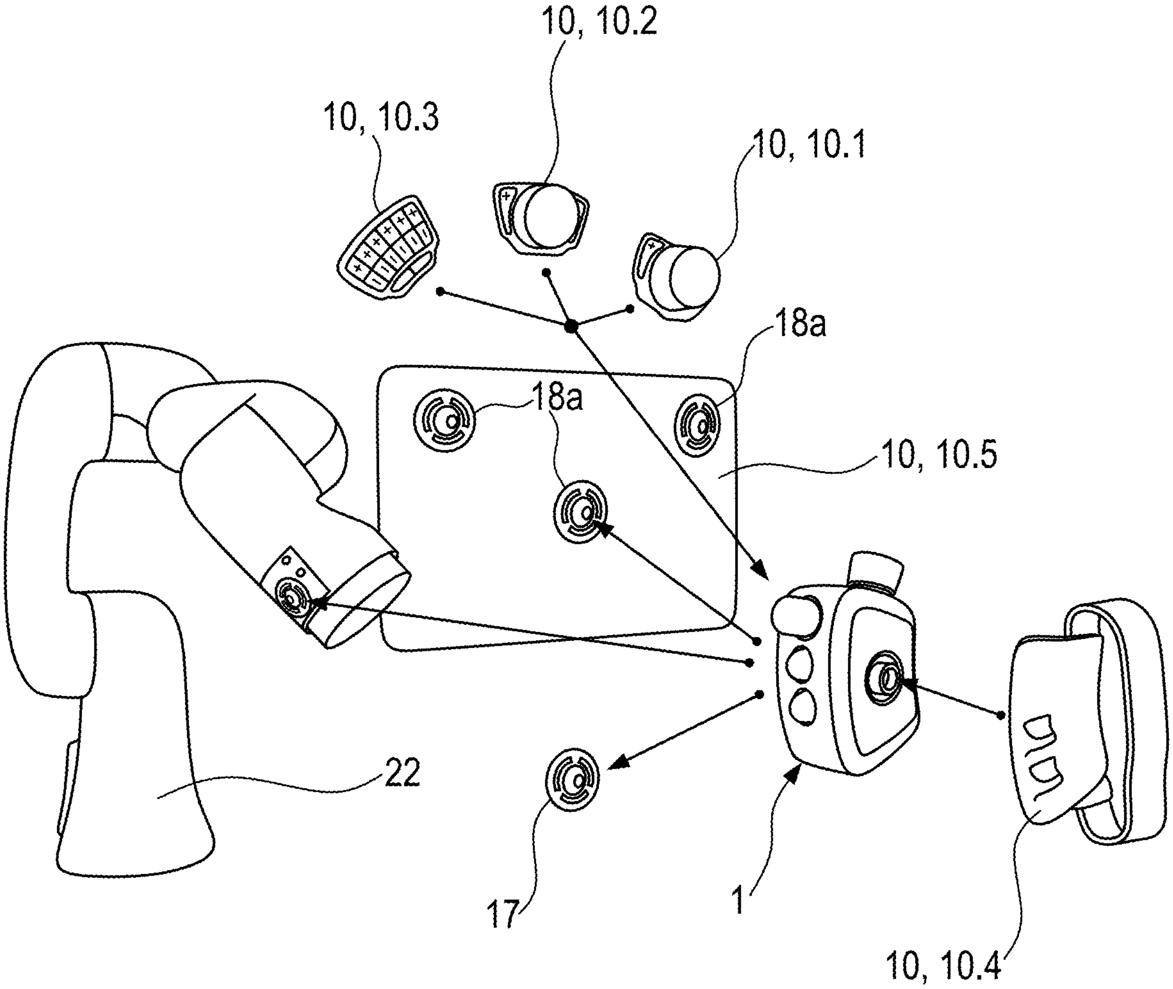
FIG. 17 is a schematic overview of examples of various modules that can be optionally coupled to the tablet computer according to FIG. 15 together with the modular robot-operated handheld device according to FIG. 1.

As shown in FIG. 4 and FIG. 17, a connection module 10 can be designed as a device separate from the modular robot-operated handheld device 1 and from the group of devices comprising a tablet computer 10.5, a computer keyboard 10.3, a computer mouse, a joystick 10.1, jog shuttle 10.2 and a jog dial, and have a module housing 25 which has a module counter-coupling means which corresponds in a shape-complementing manner to the first mechanical coupling means 7.1 and to the second mechanical coupling means 7.2 of the modular robot-operated handheld device 1.

Figure 8:
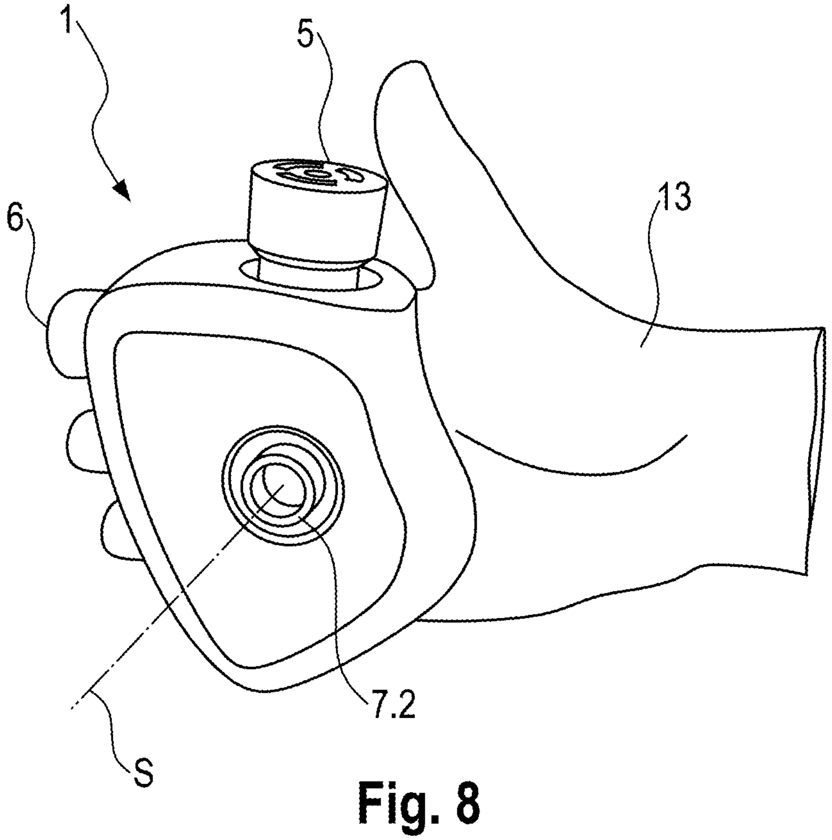
FIG. 8 is an illustration, viewed from the left, of an example of manual gripping of the modular robot-operated handheld device according to FIG. 1, with the thumb extended for actuating an emergency-stop switching means.
Figure 9:
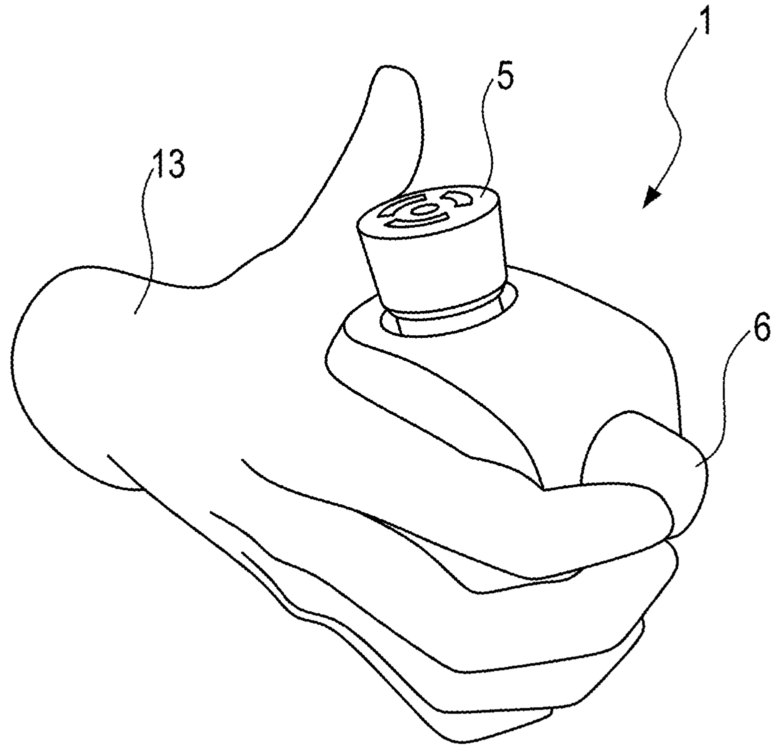
FIG. 9 is an illustration, viewed from the right, of an example of manual gripping of the modular robot-operated handheld device according to FIG. 1, with the thumb extended for actuating an emergency-stop switching means.

In the case of the present exemplary embodiment, the first mechanical coupling means 7.1 and the second mechanical coupling means 7.2 are each designed to be rotationally symmetrical with respect to an axis of symmetry S (FIG. 5, FIG. 8) aligned perpendicularly to the plane of the respectively associated end wall 3.1, 3.2, such that the connection module 10 to be coupled in each case can be coupled to the modular robot-operated handheld device 1 in a plurality of different rotational positions.

Figure 5:
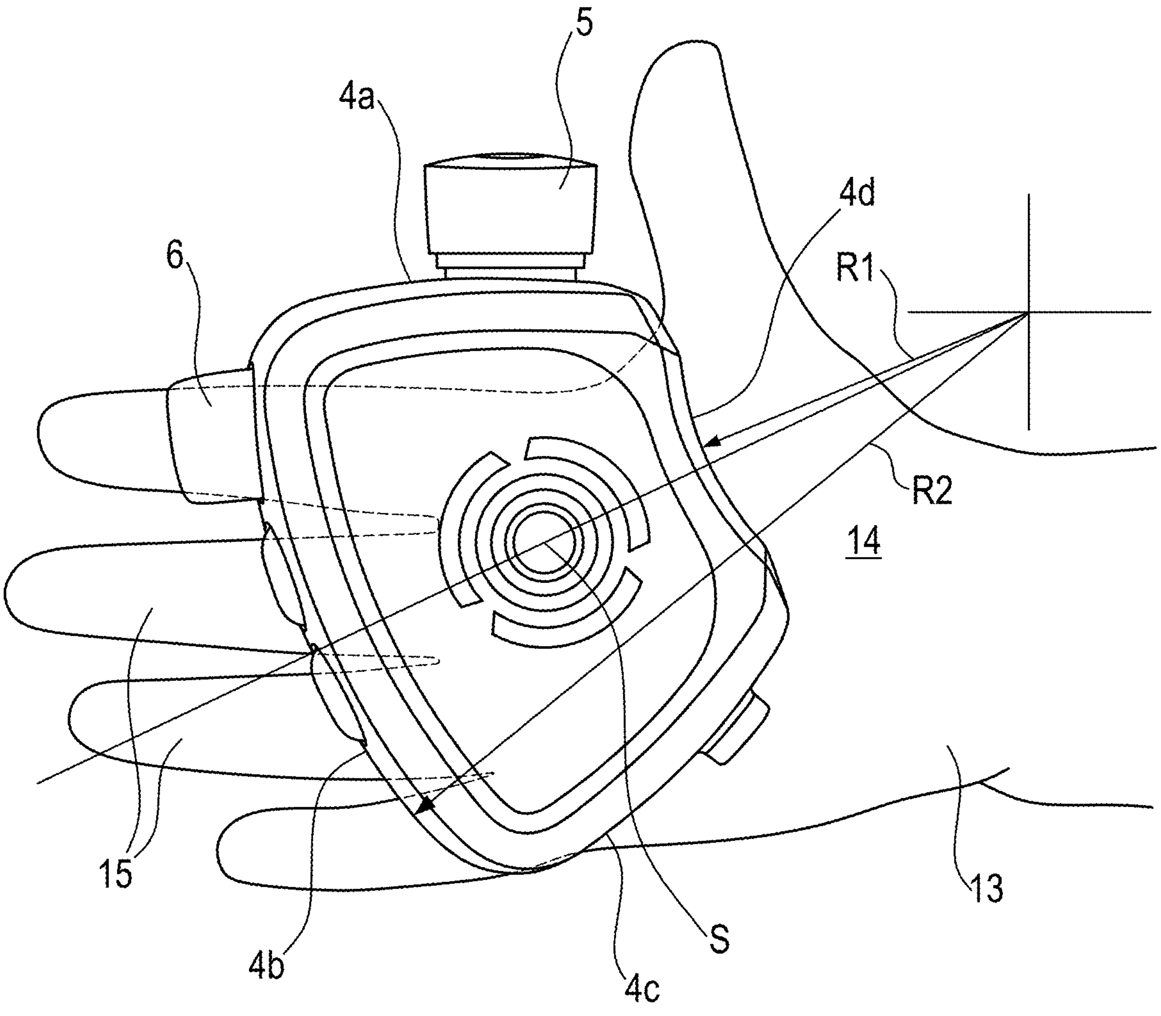
FIG. 5 is an illustration of a possible geometric shaping of the modular robot-operated handheld device according to FIG. 1 for ergonomic adaptation to the hand of a person.
Figure 6:
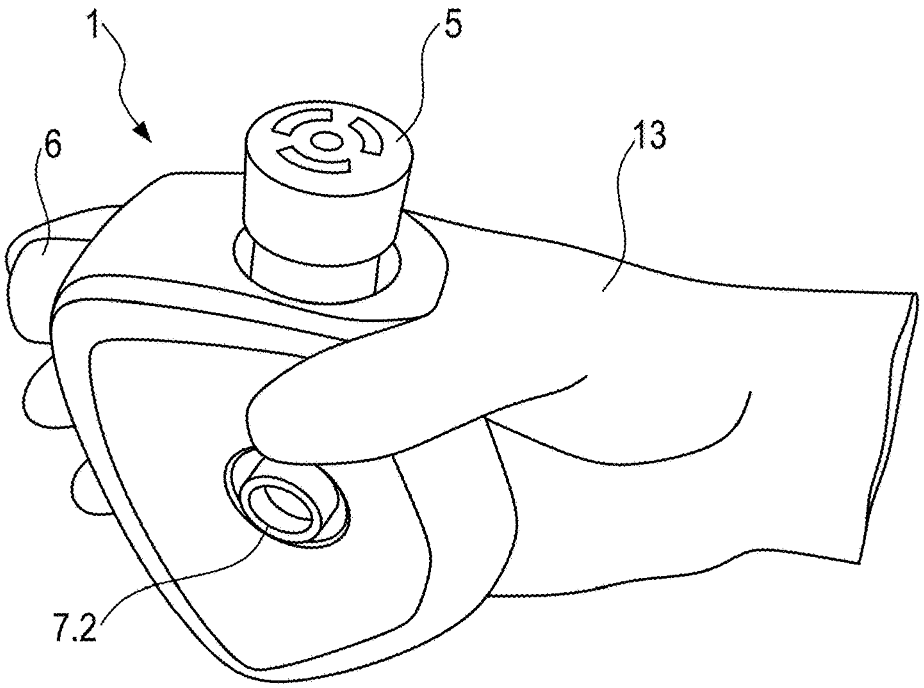
FIG. 6 is an illustration, viewed from the left, of an example of manual gripping of the modular robot-operated handheld device according to FIG. 1, with the thumb in contact.
Figure 7:
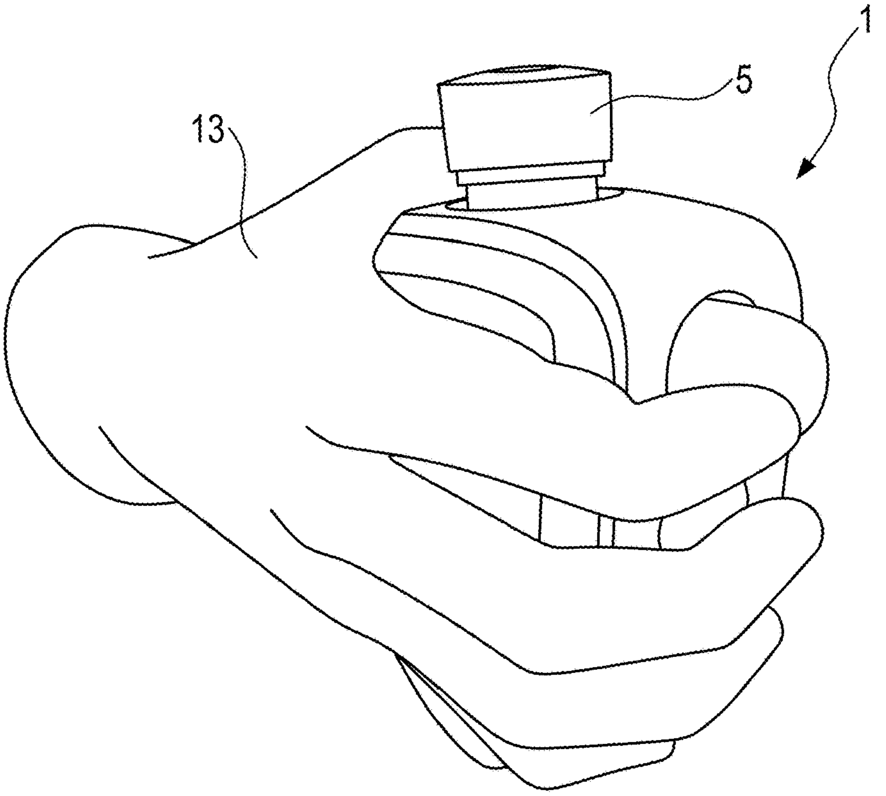
FIG. 7 is an illustration, viewed from the right, of an example of manual gripping of the modular robot-operated handheld device according to FIG. 1, with the thumb in contact.

In the case of the present exemplary embodiment, the longitudinal wall 4 has an upper longitudinal outer surface portion 4*a*, a lower longitudinal outer surface portion 4*c*, a front convex longitudinal outer surface portion 4*b* which forms a finger support region, and a rear concave longitudinal outer surface portion 4*d* which forms a palm support region, as is shown in more detail in particular in FIG. 5.

The concave shape, in particular a radius of curvature R1 of the rear concave longitudinal outer surface portion 4*d*, can be adapted to the shape of a palm 14 of the hand 13 of a person or correspond thereto. In such a sense, the front convex longitudinal outer surface portion 4*b* can also have a radius of curvature R2 which is adapted to the position of partially curved fingers 15 of the hand 13 of a person or corresponds to their positions when the modular robot-operated handheld device 1 is held in the hand 13. In this respect, the front convex longitudinal outer surface portion 4*b* can extend coaxially at a distance with the rear concave longitudinal outer surface portion 4*d*.

FIG. 6 to FIG. 9 show the modular robot-operated handheld device 1 held, for example, in a person's right hand 13.

Figure 10:
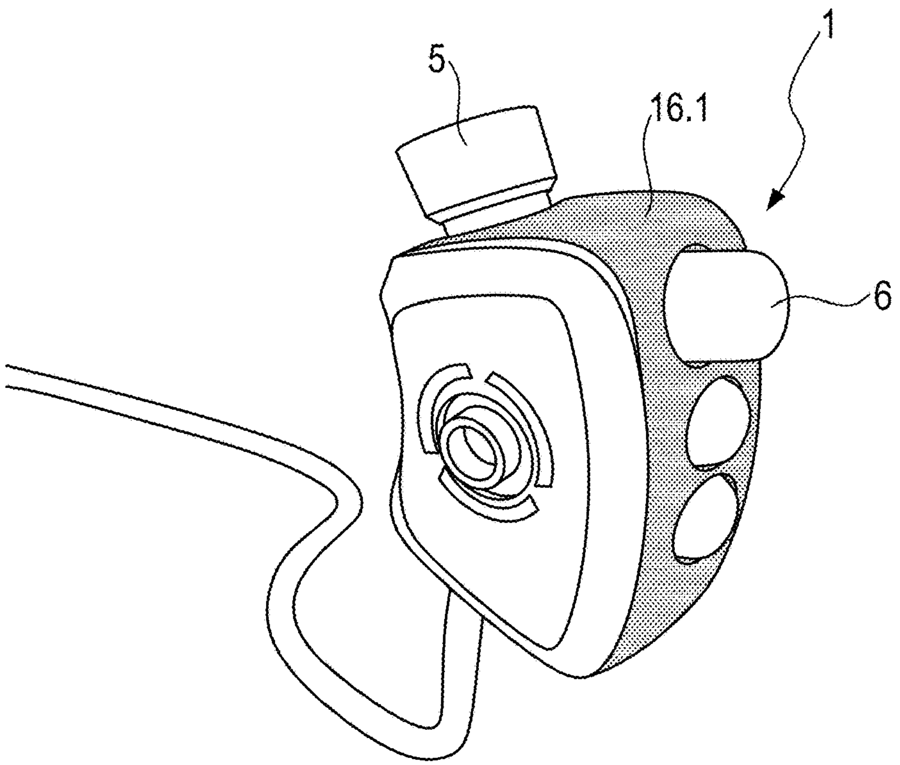
FIG. 10 is an illustration of the modular robot-operated handheld device according to FIG. 1, which is equipped with a first lighting means.
Figure 11:
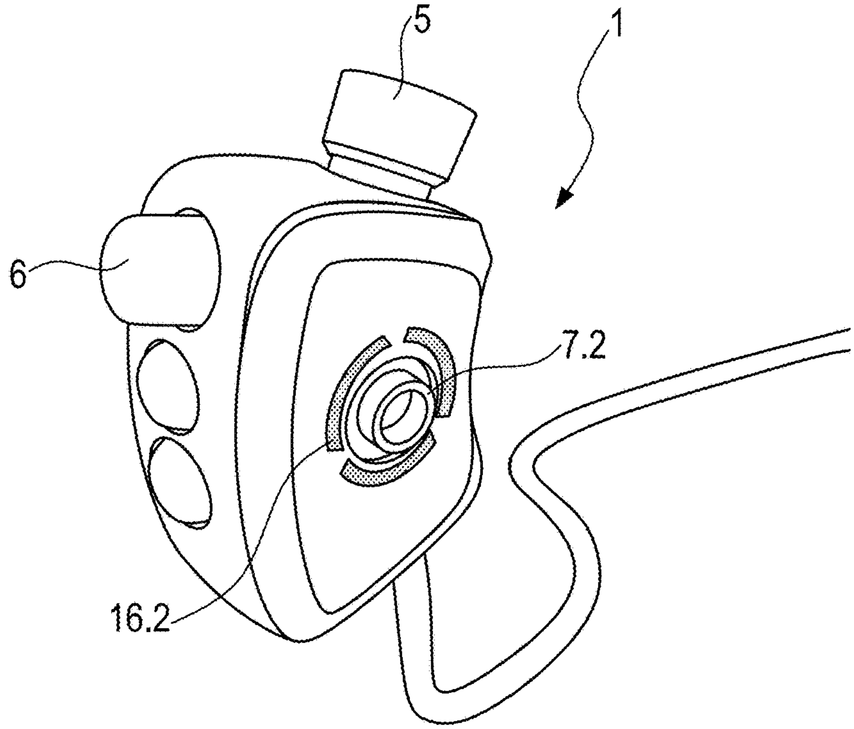
FIG. 11 is an illustration of the modular robot-operated handheld device according to FIG. 1, which is equipped with a second lighting means.

As shown in FIG. 10 and FIG. 11, at least one first lighting means 16.1 can be arranged on the longitudinal wall 4 of the modular robot-operated handheld device 1, and/or at least one second lighting means 16.2 can be arranged on at least one of the two end walls 3.1, 3.2 of the modular robot-operated handheld device 1.

Figure 12:
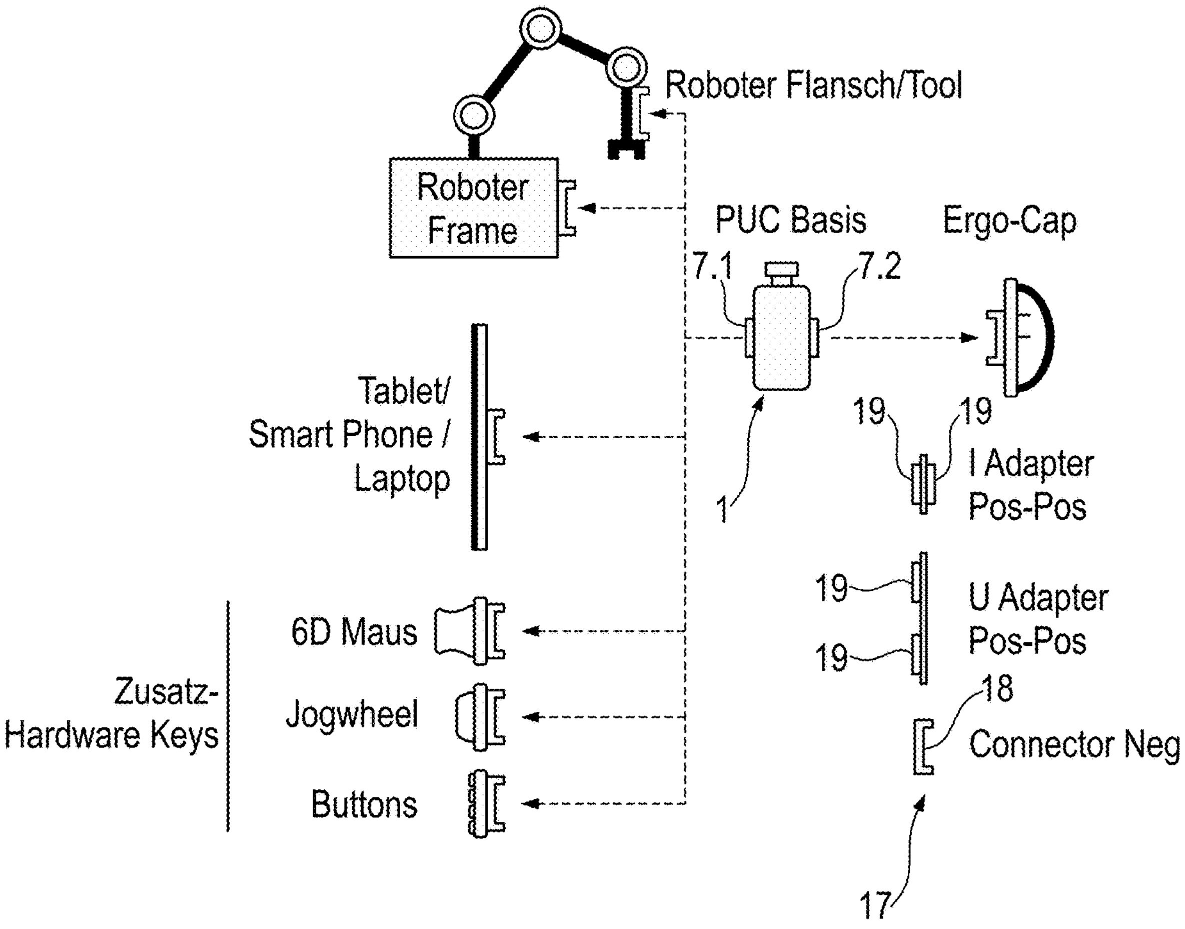
FIG. 12 is a schematic overview of a plurality of modules that can be optionally coupled to the modular robot-operated handheld device according to FIG. 1.
Figure 13:
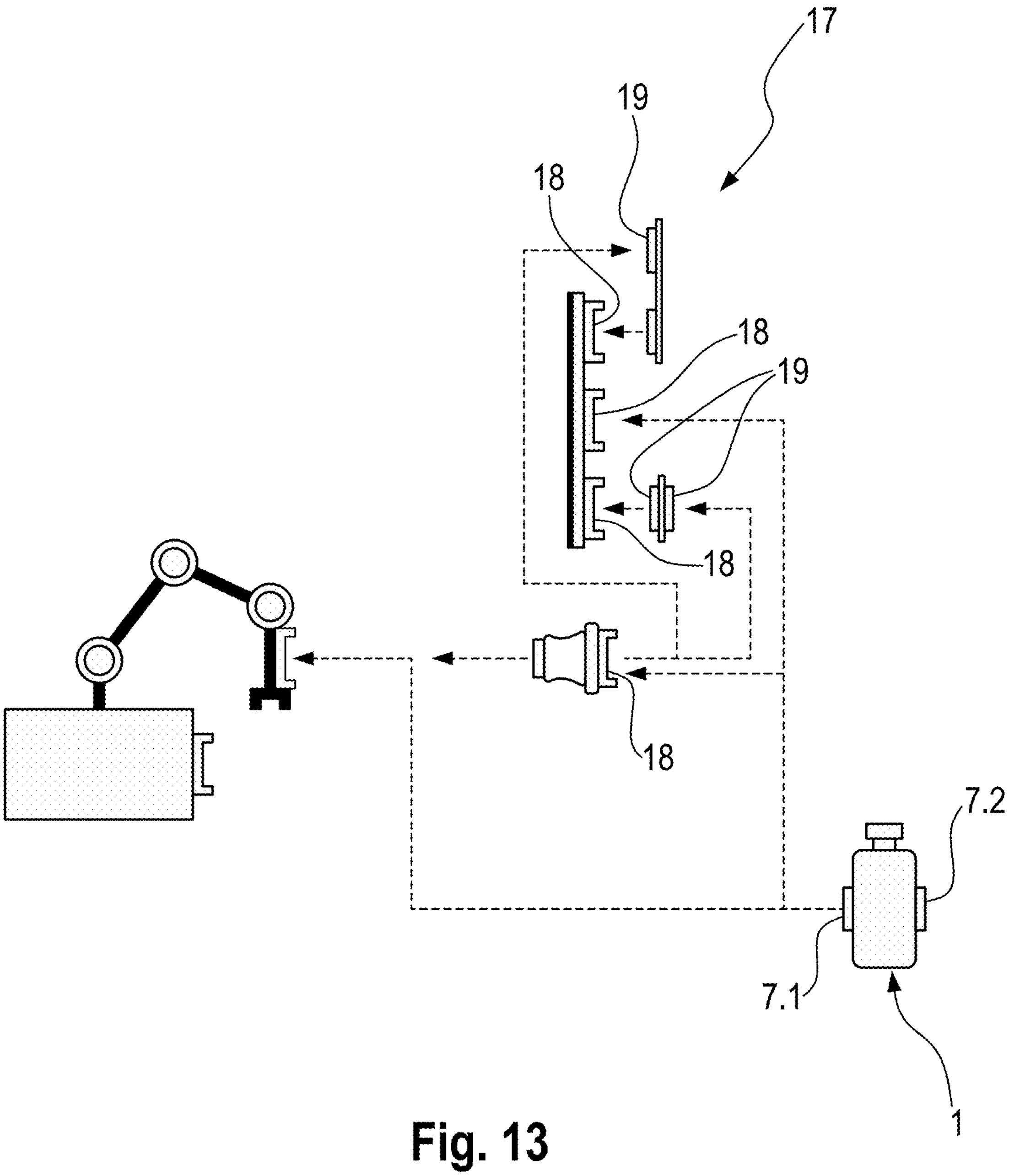
FIG. 13 is a schematic overview of how an example of an intermediate module can couple the modular robot-operated handheld device according to FIG. 1 to a robot arm.
Figure 14:
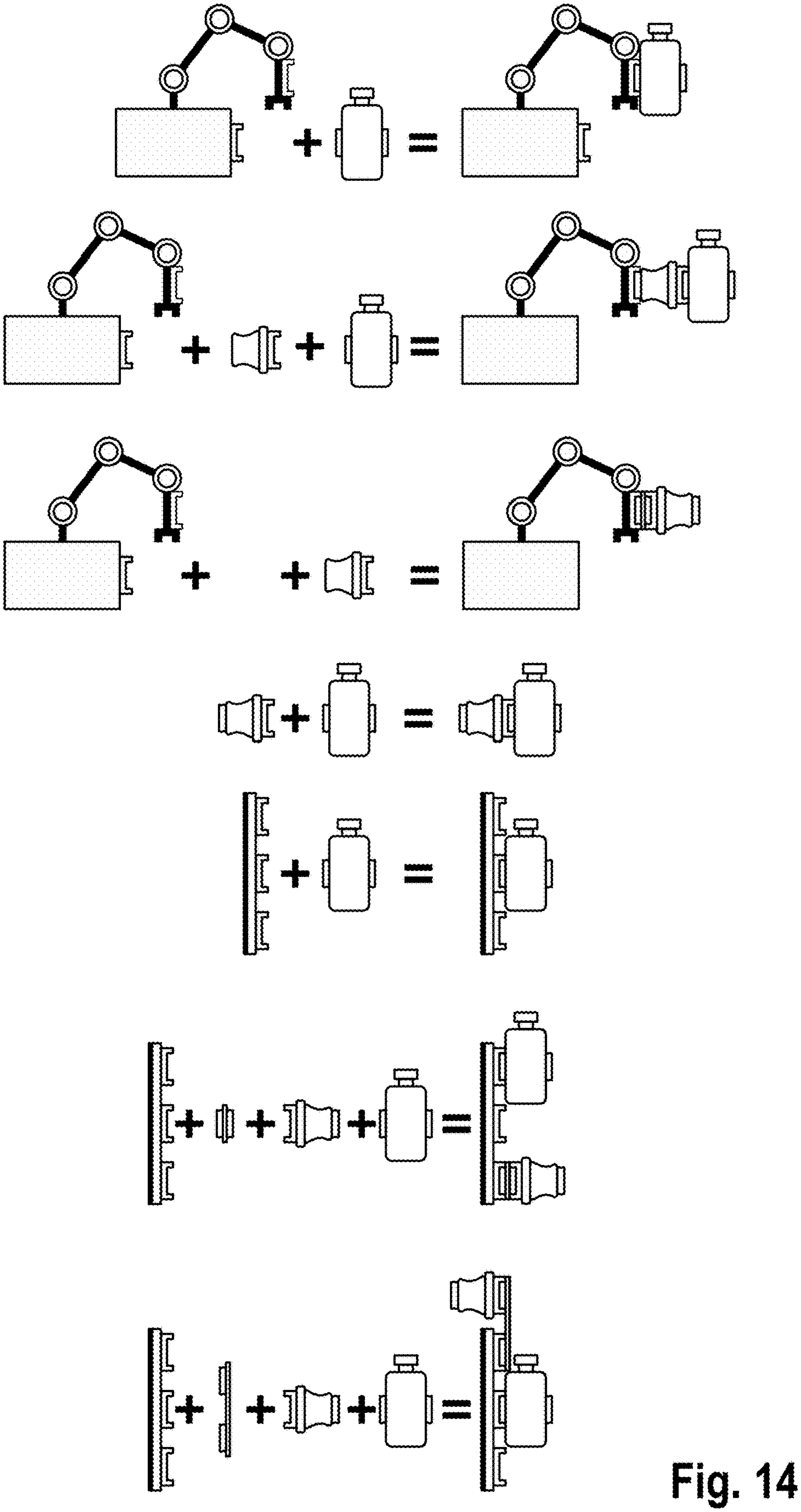
FIG. 14 is a schematic overview of a plurality of examples of module combinations of the modular robot-operated handheld device according to FIG. 1.

FIG. 12 to FIG. 14 show different embodiments of removable adapters 17 that can be coupled to the modular robot-operated handheld device 1. Such an adapter 17 has a counter-coupling means 18 that corresponds in a shape-complementing manner to the first mechanical coupling means 7.1 and to the second mechanical coupling means 7.2 of the modular robot-operated handheld device 1. At least one further mechanical coupling means 19, which is identical to the first mechanical coupling means 7.1 and to the second mechanical coupling means 7.2 of the modular robot-operated handheld device 1, is also part of the adapter 17.

Figure 15:
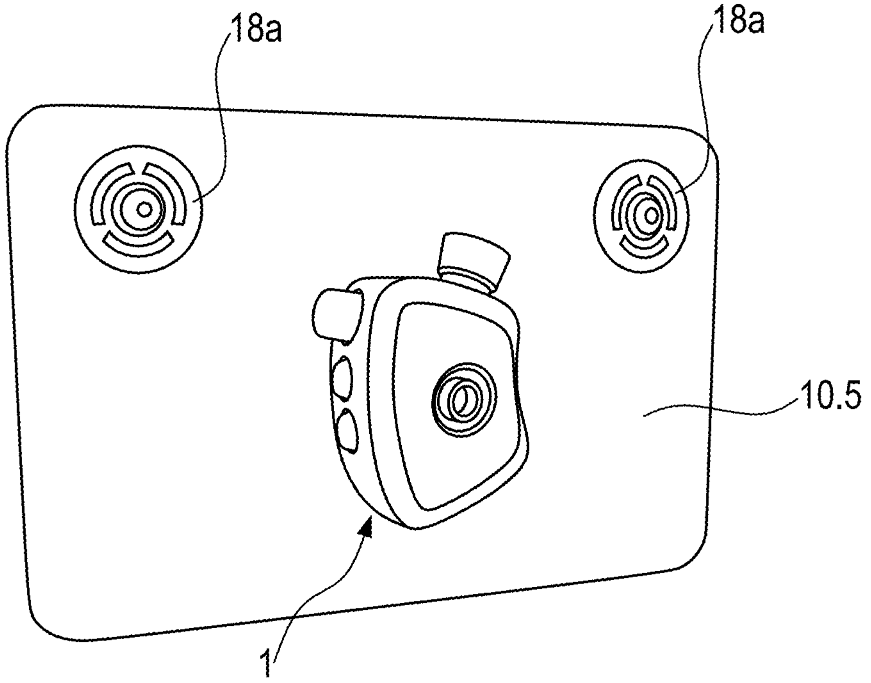
FIG. 15 is a perspective view of a tablet computer from behind, with the coupled modular robot-operated handheld device according to FIG. 1.

FIG. 15 shows a tablet computer 10.5 with a plurality of counter-coupling means 18*a*, the modular robot-operated handheld device 1 being coupled to a central counter-coupling means 18*a*.

Figure 16:
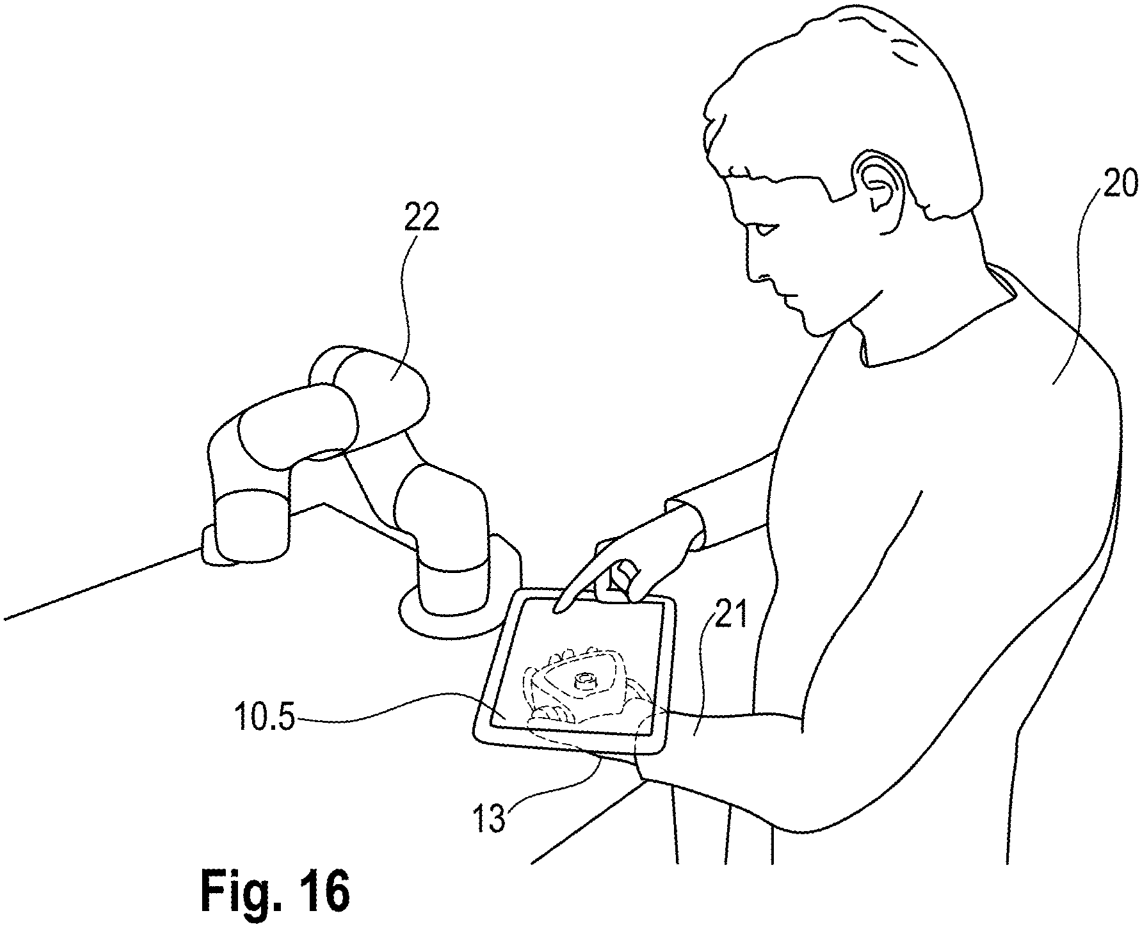
FIG. 16 is a perspective view of a person who can hold the tablet computer according to FIG. 15 in his hand via the coupled modular robot-operated handheld device according to FIG. 1.

FIG. 16 illustrates how a person 20 can hold the modular robot-operated handheld device 1 in his hand 13, for example with his left hand 13, it being possible, due to the coupling, for the tablet computer 10.5 to be carried and optionally to rest in part on the forearm 21 of the person 20. For example, a robot arm 22 can be controlled via the tablet computer 10.5 and the coupled modular robot-operated handheld device 1.

FIG. 17 illustrates how the different connection modules 10, 10.1, 10.2, 10.3, 10.4, 10.5 can be optionally coupled to the modular robot-operated handheld device 1.

Figure 18:
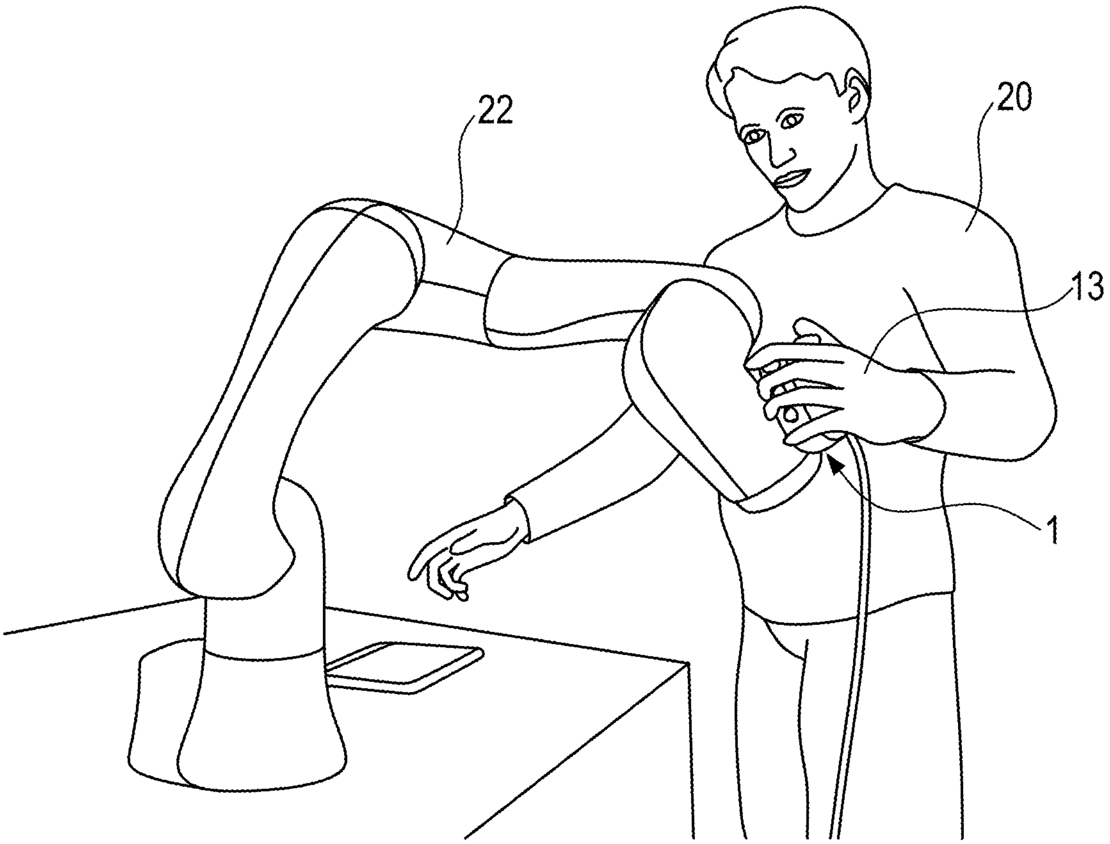
FIG. 18 is a perspective view of a person manually guiding a robot arm using the coupled modular robot-operated handheld device according to FIG. 1.

FIG. 18 illustrates manual hand guidance of a robot arm 22 by the person 20 when the modular robot-operated handheld device 1 is coupled to a link of the robot arm 22 and the person 20 guides the robot arm by manually actuating the modular robot-operated handheld device 1.

Figure 19:
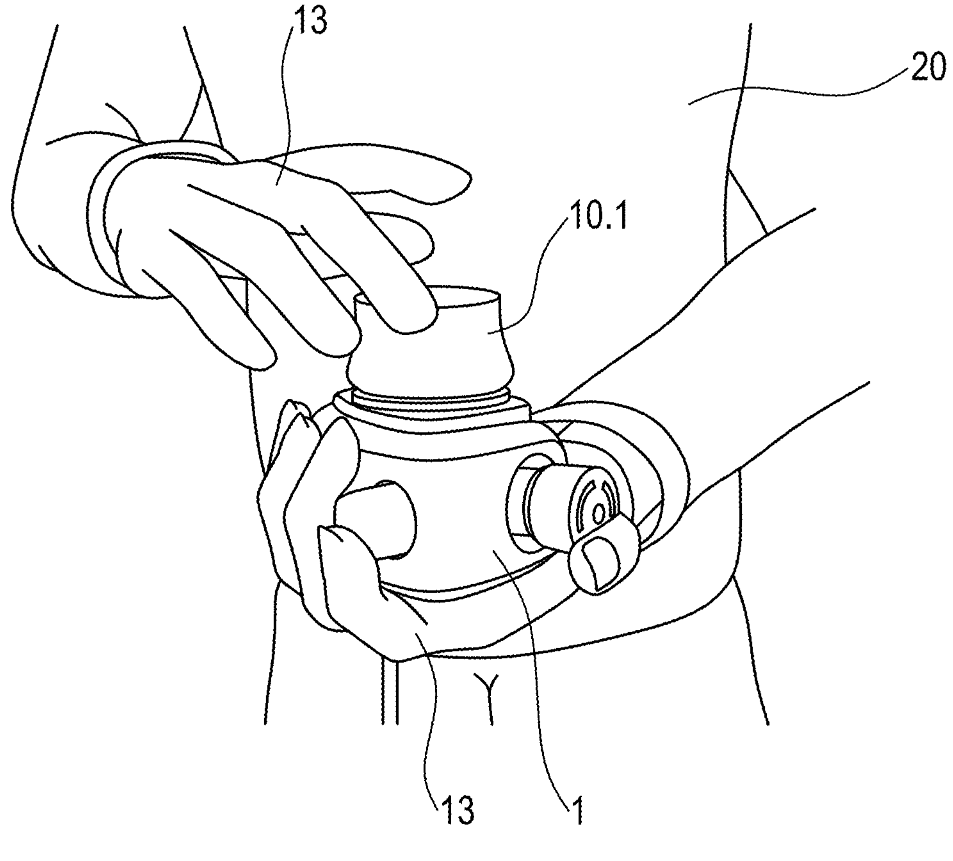
FIG. 19 is a perspective view of a person operating a modular joystick coupled to the modular robot-operated handheld device according to FIG. 1.

FIG. 19 shows an example of how a connection module 10 in the form of a joystick 10.1 can be coupled to the modular robot-operated handheld device 1, so that a person 20 can hold the modular robot-operated handheld device 1, for example, in his left hand 13 and operate the joystick 10.1 with his right hand 13.

Figure 20:
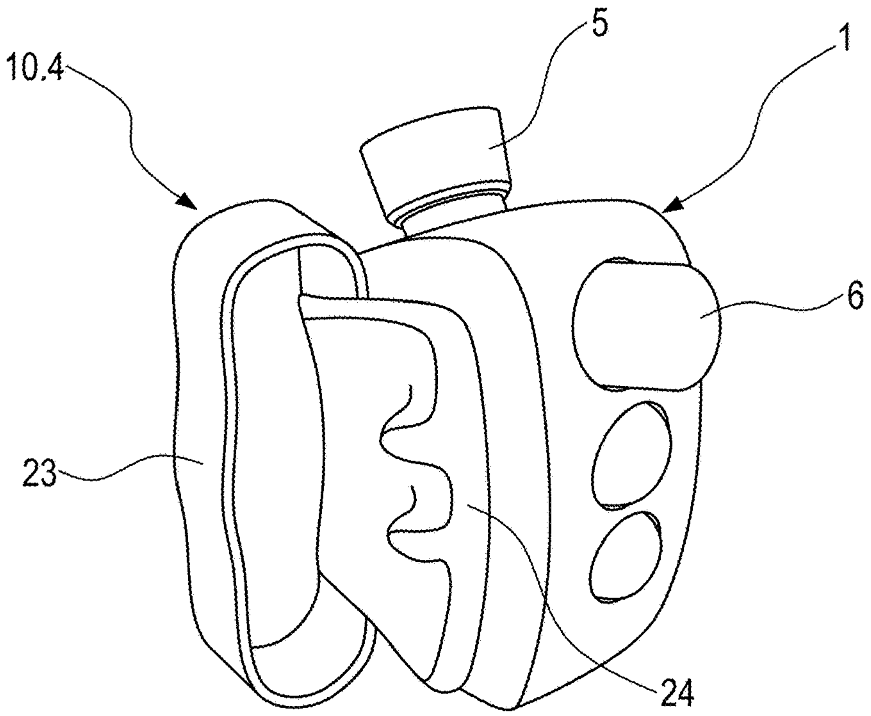
FIG. 20 is a perspective view from the front of the modular robot-operated handheld device according to FIG. 1 with a coupled hand strap.
Figure 21:
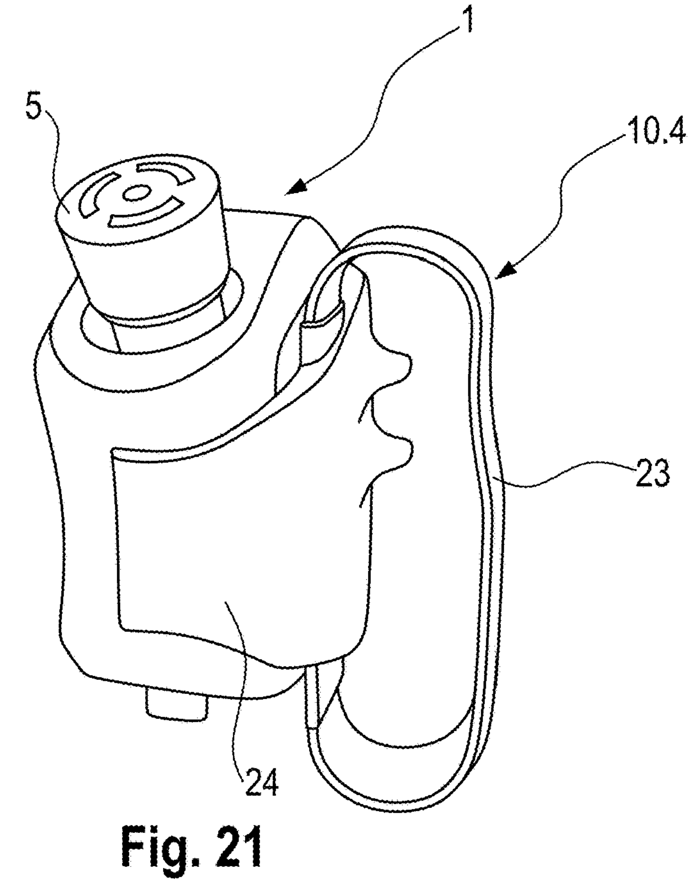
FIG. 21 is a perspective view from the rear of the modular robot-operated handheld device according to FIG. 1 with the coupled hand strap according to FIG. 20.

FIG. 20 and FIG. 21 show the modular robot-operated handheld device 1 together with a holding strap 10.4, which comprises a strap loop portion 23 which is designed to run over the back of a hand 13 of a person 20 when the person 20 is holding the modular robot-operated handheld device 1 in his hand 13, and the strap loop portion 23 is connected to a connecting member 24 which has a counter-coupling member which corresponds in a shape-complementing manner to the first mechanical coupling means 7.1 and the second mechanical coupling means 7.2 of the modular robot-operated handheld device 1 and which is designed to hold the strap loop portion 23 on the modular robot-operated handheld device 1 when the holding strap 10.4 is attached to the modular robot-operated handheld device 1.

Figure 22:
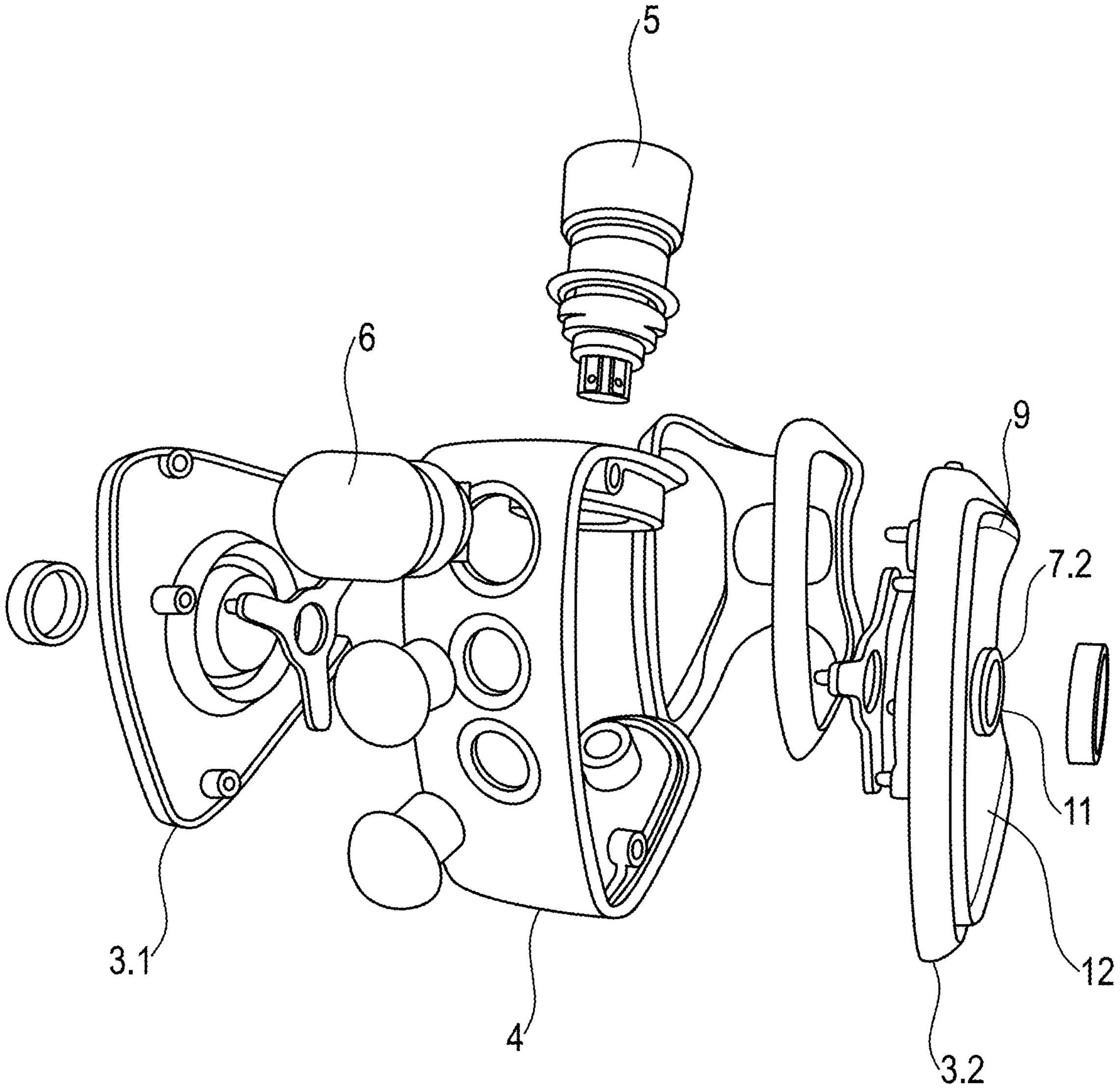
FIG. 22 is an exploded view of a plurality of components of the modular robot-operated handheld device according to FIG. 1.

FIG. 22 shows the modular robot-operated handheld device 1 according to the exemplary embodiment again in an exploded view.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A modular, handheld robot-operating device, comprising:

a housing in the shape of a generalized straight cylinder with first and second oppositely disposed, uniform end walls, and a peripheral wall connecting the first and second end walls;

a safety base control device arranged in the housing;

an emergency-stop switch arranged on the peripheral wall and operatively connected in terms of control technology to the safety base control device;

an approval device arranged on the peripheral wall and operatively connected to the safety base control device; and a first mechanical coupling formed on the first end wall, and a second mechanical coupling identical to the first mechanical coupling and formed on the second end wall;

the first and second mechanical couplings configured to be selectively coupled with a connection module, whereby the connection module can be selectively mechanically coupled to the first mechanical coupling on a right-hand side of the robot-operating device, or mechanically coupled to the second mechanical coupling on a left-hand side of the robot-operating device.

2. The robot-operating device of claim 1, wherein each of the first mechanical coupling and the second mechanical coupling comprises a form-locking element configured for axially plugging and axially unplugging a connection module in a plug-in direction perpendicular to the respectively associated end wall, and configured for locking the connection module, in a form-fitting manner, perpendicularly to the plug-in direction.

3. The robot-operating device of claim 1, wherein the first mechanical coupling and the second mechanical coupling are each arranged centrally in a central surface portion of the respectively associated end wall, and are each enclosed by a support surface formed on the respectively associated end wall and surrounding the respective central surface portion.

4. The robot-operating device of claim 1, wherein each of the first mechanical coupling and the second mechanical coupling is formed by a central dome arranged in a recess of the respectively associated end wall, and projecting outwardly from a bottom of the recess.

5. The robot-operating device of claim 1, wherein the first mechanical coupling and the second mechanical coupling are each designed to be rotationally symmetrical to an axis of symmetry aligned perpendicularly to a plane of the respectively associated end wall, such that a connection module is couplable to the robot-operating device in a plurality of different rotational positions.

6. The robot-operating device of claim 1, wherein the peripheral wall comprises:

an upper longitudinal outer surface portion;

a lower longitudinal outer surface portion;

a front convex longitudinal outer surface portion that forms a finger support region of the robot-operating device; and a rear concave longitudinal outer surface portion that forms a palm support region of the robot-operating device.

7. The robot-operating device of claim 1, further comprising a removable adapter, the removable adapter comprising:

a counter-coupling having a shape complementary to the first mechanical coupling and the second mechanical coupling of the robot-operating device; and at least one third mechanical coupling which is identical in configuration to the first mechanical coupling and the second mechanical coupling of the robot-operating device.

8. The robot-operating device of claim 1, further comprising at least one of:

at least one first lighting means arranged on the peripheral wall; or at least one second lighting means arranged on at least one of the first or second end walls.

9. The robot-operating device of claim 1, further comprising:

a holding strap including a strap loop portion configured to run over the back of a hand of a person while holding the robot-operating device; and a connecting member couplable with the strap loop portion, the connecting member including a counter-coupling member having a shape complementary to the first mechanical coupling and the second mechanical coupling for selective coupling thereto;

the connecting member configured to hold the strap loop portion on the robot-operating device when the connecting member is coupled with the housing.

10. A robot control system, comprising:

the robot-operating device of claim 1; and at least one connection module couplable to the robot operating device;

the at least one connection module comprising a tablet computer, a computer keyboard, a computer mouse, a joystick, jog shuttle, or a jog dial;

the at least one connection module comprising a module housing having at least one module counter-coupling;

the at least one module counter-coupling having a shape complementary to the first mechanical coupling and the second mechanical coupling of the robot-operating device, for selective coupling thereto.

* * * * *